(12) United States Patent
Heath et al.

(10) Patent No.: US 12,390,866 B2
(45) Date of Patent: *Aug. 19, 2025

(54) HOLE SAW WITH HEX SIDEWALL HOLES

(71) Applicant: Milwaukee Electric Tool Corporation, Brookfield, WI (US)

(72) Inventors: Peter Russell Heath, Wauwatosa, WI (US); Bryan C. Ward, Wauwatosa, WI (US); Steven W. Hyma, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,800

(22) Filed: Nov. 3, 2023

(65) Prior Publication Data

US 2024/0058875 A1   Feb. 22, 2024

Related U.S. Application Data

(63) Continuation of application No. 17/495,008, filed on Oct. 6, 2021, now Pat. No. 11,845,134, which is a continuation of application No. 16/518,326, filed on Jul. 22, 2019, now Pat. No. 11,148,212, which is a continuation of application No. PCT/US2019/041175, filed on Jul. 10, 2019.

(60) Provisional application No. 62/696,141, filed on Jul. 10, 2018.

(51) Int. Cl.
B23B 51/04 (2006.01)
(52) U.S. Cl.
CPC ...... *B23B 51/0467* (2022.01); *B23B 51/0473* (2013.01); *Y10T 408/8953* (2015.01)

(58) Field of Classification Search
CPC ............ B23B 51/0453; B23B 51/0467; B23B 51/0469; B23B 51/0473; Y10T 408/8953
See application file for complete search history.

(56) References Cited

U.S. PATENT DOCUMENTS

| | | | |
|---|---|---|---|
| 118,806 | A | 9/1871 | Lafferty et al. |
| 308,842 | A | 12/1884 | Hunt |
| 1,123,730 | A | 1/1915 | Greenfield |
| 1,629,581 | A | 5/1927 | Machlet |

(Continued)

FOREIGN PATENT DOCUMENTS

| | | |
|---|---|---|
| CN | 2303698 | 1/1999 |
| CN | 201799668 | 4/2011 |

(Continued)

OTHER PUBLICATIONS

U.S. Appl. No. 29/656,110, filed Jul. 10, 2018, Heath et al.

(Continued)

*Primary Examiner* — Eric A. Gates
(74) *Attorney, Agent, or Firm* — Reinhart Boerner Van Deuren s.c.

(57) ABSTRACT

A hole saw including a plurality of sidewall openings is provided. The sidewall openings are shaped and grouped in patterns that improve debris ejection of the hole saw and that allow for easy access to the interior of the hole saw for manual debris removal by the user. The opening groups are space from each other by larger uninterrupted areas such that the hole saw has a high strength despite the number and size of openings provided in the saw sidewall.

19 Claims, 14 Drawing Sheets

(56) References Cited

U.S. PATENT DOCUMENTS

| | | | |
|---|---|---|---|
| 2,015,339 A | 9/1935 | Ellingham | |
| 2,062,257 A | 11/1936 | Douglas et al. | |
| 2,237,901 A | 4/1941 | Chun | |
| 2,319,528 A | 5/1943 | Barbour et al. | |
| 2,349,400 A | 5/1944 | Wendell | |
| 2,412,433 A | 12/1946 | Taylor | |
| 2,427,085 A | 9/1947 | Allison | |
| 2,444,099 A | 6/1948 | Hennessey, Jr. | |
| 2,473,077 A | 6/1949 | Starbuck, Jr. | |
| 2,615,245 A | 10/1952 | Schaumleffel | |
| 2,662,428 A | 12/1953 | Mueller | |
| 2,680,898 A | 6/1954 | Diosi, Sr. | |
| 2,754,864 A | 7/1956 | Elsy | |
| 2,779,361 A | 1/1957 | McKiff | |
| 2,800,812 A | 7/1957 | Mueller et al. | |
| 2,923,180 A | 2/1960 | Dunn | |
| 2,951,683 A | 9/1960 | Tilden | |
| 2,969,122 A | 1/1961 | Steffes | |
| 3,025,917 A | 3/1962 | Knoblauch | |
| 3,074,392 A | 1/1963 | Fisher | |
| 3,162,067 A | 12/1964 | Koons et al. | |
| 3,265,104 A | 8/1966 | Gallo, Sr. | |
| 3,331,455 A | 7/1967 | Anderson, Jr. et al. | |
| 3,374,696 A | 3/1968 | Trevathan | |
| 3,382,743 A | 5/1968 | Trevathan | |
| 3,494,348 A | 2/1970 | Lindblad | |
| 3,495,359 A | 2/1970 | Smith et al. | |
| 3,647,310 A | 3/1972 | Morse | |
| 3,778,179 A | 12/1973 | Rivas | |
| 3,824,026 A | 7/1974 | Gaskins | |
| 3,836,278 A | 9/1974 | Mcinnes | |
| 3,870,431 A | 3/1975 | Luckenbi, II et al. | |
| 3,880,546 A | 4/1975 | Segal | |
| 3,920,350 A | 11/1975 | Southall | |
| 3,973,862 A | 8/1976 | Segal | |
| 3,976,387 A | 8/1976 | Segal | |
| 3,997,279 A | 12/1976 | Porter | |
| 4,072,441 A | 2/1978 | LaPointe | |
| 4,077,737 A | 3/1978 | Morse | |
| 4,078,458 A | 3/1978 | Berendzen | |
| 4,101,238 A | 7/1978 | Reibetanz et al. | |
| 4,147,464 A | 4/1979 | Watson et al. | |
| 4,148,593 A | 4/1979 | Clark | |
| 4,189,015 A | 2/1980 | Acker et al. | |
| 4,201,502 A | 5/1980 | Skendrovic | |
| 4,203,692 A | 5/1980 | Jensen | |
| 4,225,275 A | 9/1980 | Elliott | |
| 4,303,357 A | 12/1981 | Makar | |
| 4,330,229 A | 5/1982 | Croydon | |
| 4,442,811 A | 4/1984 | Shimamura et al. | |
| D278,065 S | 3/1985 | Sydlowski et al. | |
| 4,527,449 A | 7/1985 | Sydlowski et al. | |
| 4,529,341 A | 7/1985 | Greene | |
| D282,369 S | 1/1986 | de Villiers | |
| 4,565,471 A | 1/1986 | Negishi et al. | |
| 4,568,227 A | 2/1986 | Hogg | |
| 4,582,458 A | 4/1986 | Korb et al. | |
| 4,595,321 A | 6/1986 | Van Dalen | |
| 4,605,347 A | 8/1986 | Jodock et al. | |
| 4,741,651 A | 5/1988 | Despres | |
| 4,755,087 A | 7/1988 | Parent | |
| 4,759,667 A | 7/1988 | Brown | |
| 4,760,643 A | 8/1988 | Juma | |
| D303,118 S | 8/1989 | Cox | |
| 4,906,146 A | 3/1990 | Bowling | |
| 4,961,674 A | 10/1990 | Wang et al. | |
| 4,968,189 A | 11/1990 | Pidgeon | |
| 4,968,193 A | 11/1990 | Chaconas et al. | |
| 5,007,777 A | 4/1991 | Itokazu | |
| D317,455 S | 6/1991 | Martin | |
| 5,025,871 A | 6/1991 | Stewart et al. | |
| 5,049,010 A | 9/1991 | Oakes | |
| 5,061,126 A | 10/1991 | Cain et al. | |
| D321,894 S | 11/1991 | Harris | |
| 5,069,584 A | 12/1991 | Obermeier et al. | |
| 5,076,741 A | 12/1991 | Litlehorn | |
| 5,096,341 A | 3/1992 | Despres | |
| 5,098,234 A | 3/1992 | Judkins et al. | |
| 5,115,796 A | 5/1992 | Schweickhardt | |
| 5,145,018 A | 9/1992 | Schimke et al. | |
| 5,171,111 A | 12/1992 | Kishimoto | |
| D332,492 S | 1/1993 | Rosenberg et al. | |
| D334,016 S | 3/1993 | Jonsson | |
| 5,205,685 A | 4/1993 | Herbert | |
| D342,270 S | 12/1993 | Kwang | |
| 5,273,380 A | 12/1993 | Musacchia | |
| 5,288,183 A | 2/1994 | Chaconas et al. | |
| 5,291,806 A | 3/1994 | Bothum | |
| 5,316,416 A | 5/1994 | Kim | |
| 5,353,552 A | 10/1994 | Hemmings | |
| 5,392,759 A | 2/1995 | Kwang | |
| 5,415,504 A | 5/1995 | Wolf et al. | |
| 5,435,672 A | 7/1995 | Hall et al. | |
| 5,451,128 A | 9/1995 | Hattersley | |
| D363,294 S | 10/1995 | Ellis | |
| 5,466,100 A | 11/1995 | Ahluwalia | |
| D372,485 S | 8/1996 | Stone et al. | |
| 5,556,399 A | 9/1996 | Huebner | |
| D376,809 S | 12/1996 | Stone et al. | |
| 5,649,796 A | 7/1997 | Durney | |
| 5,651,646 A | 7/1997 | Banke et al. | |
| 5,690,452 A | 11/1997 | Baublits | |
| 5,700,113 A | 12/1997 | Stone et al. | |
| D391,974 S | 3/1998 | Brutscher | |
| D392,297 S | 3/1998 | Brutscher | |
| D394,663 S | 5/1998 | Stone et al. | |
| 5,762,498 A | 6/1998 | Gonzalez | |
| 5,803,677 A | 9/1998 | Brutscher et al. | |
| 5,810,524 A | 9/1998 | Wirth, Jr. et al. | |
| 5,816,754 A | 10/1998 | Shallenberger | |
| 5,842,820 A | 12/1998 | Lee et al. | |
| 5,888,036 A | 3/1999 | Arai et al. | |
| D408,424 S | 4/1999 | Schmotzer | |
| 5,904,454 A | 5/1999 | Washer | |
| 5,931,615 A | 8/1999 | Wiker | |
| 5,934,845 A | 8/1999 | Frey | |
| 5,980,169 A | 11/1999 | Hinch | |
| 6,007,279 A | 12/1999 | Malone, Jr. | |
| D419,576 S | 1/2000 | Burcher et al. | |
| 6,036,410 A | 3/2000 | Shun'ko | |
| 6,050,754 A | 4/2000 | Thomas | |
| 6,113,321 A | 9/2000 | Mulroy et al. | |
| 6,126,367 A | 10/2000 | Reed | |
| 6,152,815 A | 11/2000 | Meerdink et al. | |
| 6,167,792 B1 | 1/2001 | Korb et al. | |
| D438,219 S | 2/2001 | Brutscher | |
| 6,190,097 B1 | 2/2001 | Thomas | |
| 6,206,616 B1 | 3/2001 | Smith et al. | |
| 6,267,542 B1 | 7/2001 | Salmon | |
| 6,269,722 B1 | 8/2001 | Hellbergh | |
| 6,273,652 B1 | 8/2001 | Wirth, Jr. et al. | |
| D447,495 S | 9/2001 | Strobel et al. | |
| 6,341,925 B1 | 1/2002 | Despres | |
| D455,446 S | 4/2002 | Collins | |
| 6,409,436 B1 | 6/2002 | Despres | |
| 6,419,428 B2 | 7/2002 | Ajimi et al. | |
| 6,428,250 B2 | 8/2002 | Giebmanns | |
| 6,431,289 B1 | 8/2002 | Potter et al. | |
| 6,443,674 B1 | 9/2002 | Jaconi | |
| 6,564,887 B2 | 5/2003 | Hong | |
| 6,588,310 B2 | 7/2003 | Lee et al. | |
| 6,588,992 B2 | 7/2003 | Rudolph | |
| 6,599,063 B1 | 7/2003 | Capstran | |
| D478,105 S | 8/2003 | Morton et al. | |
| D478,106 S | 8/2003 | Morton et al. | |
| D478,339 S | 8/2003 | Morton et al. | |
| D478,919 S | 8/2003 | Morton et al. | |
| 6,619,413 B2 | 9/2003 | Hamilton et al. | |
| 6,641,338 B2 | 11/2003 | Despres | |
| 6,641,395 B2 | 11/2003 | Kumar et al. | |
| 6,652,203 B1 | 11/2003 | Risen, Jr. | |
| 6,676,342 B2 | 1/2004 | Mast et al. | |
| 6,676,711 B2 | 1/2004 | Omi | |
| 6,698,981 B1 | 3/2004 | Beno et al. | |

(56) References Cited

U.S. PATENT DOCUMENTS

| | | |
|---|---|---|
| 6,705,807 B1 | 3/2004 | Rudolph et al. |
| 6,746,187 B2 | 6/2004 | Alm |
| 6,786,684 B1 | 9/2004 | Ecker |
| D497,547 S | 10/2004 | Kumakura et al. |
| 6,817,428 B1 | 11/2004 | Miyanaga |
| 6,817,936 B1 | 11/2004 | Skeem et al. |
| 6,820,519 B2 | 11/2004 | Lefebvre |
| 6,857,831 B2 | 2/2005 | Davis |
| 6,857,832 B2 | 2/2005 | Nygard |
| 6,863,529 B2 | 3/2005 | Strong et al. |
| D504,446 S | 4/2005 | Kobayashi |
| 6,884,245 B2 | 4/2005 | Spranza |
| 6,890,132 B1 | 5/2005 | Baron et al. |
| 6,890,133 B2 | 5/2005 | Singh et al. |
| 6,893,194 B2 | 5/2005 | Jones et al. |
| D507,585 S | 7/2005 | Held |
| 6,939,092 B2 | 9/2005 | Korb et al. |
| 6,945,414 B1 | 9/2005 | Stevens et al. |
| 6,945,850 B2 | 9/2005 | Perrey |
| 6,948,574 B2 | 9/2005 | Cramer et al. |
| 6,988,859 B2 | 1/2006 | Borschert et al. |
| 7,001,116 B2 | 2/2006 | Kozak |
| D516,594 S | 3/2006 | Morton |
| 7,017,465 B2 | 3/2006 | Dion et al. |
| 7,018,143 B2 | 3/2006 | Moore |
| D519,531 S | 4/2006 | Kobashi |
| D523,398 S | 6/2006 | Ellis |
| D526,670 S | 8/2006 | Ibey |
| 7,112,016 B2 | 9/2006 | Nordlin |
| D529,525 S | 10/2006 | Waldron et al. |
| 7,127,923 B2 | 10/2006 | Biederman et al. |
| 7,140,451 B2 | 11/2006 | Yoshimizu et al. |
| 7,160,064 B2 | 1/2007 | Jasso |
| 7,175,372 B2 | 2/2007 | Davis |
| 7,201,543 B2 | 4/2007 | Muhlfriedel et al. |
| D544,892 S | 6/2007 | Watson et al. |
| 7,237,291 B2 | 7/2007 | Redford |
| 7,237,984 B1 | 7/2007 | Guzda et al. |
| 7,237,986 B2 | 7/2007 | Anjanappa et al. |
| 7,246,975 B2 | 7/2007 | Corso et al. |
| D551,269 S | 9/2007 | Burke, III |
| 7,264,428 B2 | 9/2007 | Cossette |
| 7,267,514 B2 | 9/2007 | Wetzl et al. |
| 7,275,898 B2 | 10/2007 | Malagnino et al. |
| 7,306,411 B2 | 12/2007 | Mabuchi et al. |
| D559,874 S | 1/2008 | Kobayashi |
| D560,699 S | 1/2008 | Omi |
| D571,835 S | 6/2008 | Concari et al. |
| D573,165 S | 7/2008 | Grundvig |
| D575,808 S | 8/2008 | Zeiler et al. |
| 7,438,509 B1 | 10/2008 | Wong et al. |
| D580,462 S | 11/2008 | Liao et al. |
| 7,476,067 B2 | 1/2009 | Borschert et al. |
| D585,919 S | 2/2009 | Cantlon |
| D585,920 S | 2/2009 | Liao et al. |
| 7,488,146 B2 | 2/2009 | Brunson |
| D588,175 S | 3/2009 | Morton |
| D588,884 S | 3/2009 | Burke, III |
| 7,513,718 B1 | 4/2009 | Arnold |
| 7,520,703 B2 | 4/2009 | Rempel |
| 7,556,459 B2 | 7/2009 | Rempel |
| 7,637,703 B2 | 12/2009 | Khangar et al. |
| D608,801 S | 1/2010 | Evatt et al. |
| D608,802 S | 1/2010 | Ibarra et al. |
| 7,658,136 B2 | 2/2010 | Rempel et al. |
| 7,658,576 B1 | 2/2010 | Buzdum et al. |
| 7,661,913 B2 | 2/2010 | Nordlin |
| 7,665,935 B1 | 2/2010 | Garrick et al. |
| 7,674,078 B1 | 3/2010 | Buzdum et al. |
| D615,839 S | 5/2010 | Richter et al. |
| 7,766,583 B2 | 8/2010 | Kozak |
| 7,824,137 B2 | 11/2010 | Vasudeva et al. |
| 7,850,405 B2 | 12/2010 | Keightley |
| D630,656 S | 1/2011 | Lambert et al. |
| 7,871,224 B2 | 1/2011 | Dost et al. |
| 7,892,235 B2 | 2/2011 | Ellis |
| D634,343 S | 3/2011 | Burke, III |
| 7,913,601 B2 | 3/2011 | Petts et al. |
| 7,934,893 B2 | 5/2011 | Gillissen |
| 7,938,600 B1 | 5/2011 | Griep et al. |
| 7,959,371 B2 | 6/2011 | Keightley |
| 7,967,535 B2 | 6/2011 | Eiserer et al. |
| 7,988,389 B2 | 8/2011 | Miebach |
| 8,042,613 B2 | 10/2011 | Hallundbaek et al. |
| 8,052,356 B2 | 11/2011 | Singh |
| D659,176 S | 5/2012 | Novak et al. |
| D664,574 S | 7/2012 | Burke, III |
| 8,328,474 B2 | 12/2012 | Pangerc et al. |
| 8,328,476 B2 | 12/2012 | O'Keefe et al. |
| D687,472 S | 8/2013 | Novak et al. |
| D690,334 S | 9/2013 | Zielonka et al. |
| D692,470 S | 10/2013 | Novak et al. |
| 8,573,907 B2 | 11/2013 | Kalomeris et al. |
| 8,579,554 B2 | 11/2013 | Novak et al. |
| 8,579,555 B2 | 11/2013 | Novak et al. |
| 8,646,601 B2 | 2/2014 | Green et al. |
| D701,544 S | 3/2014 | Novak et al. |
| D706,845 S | 6/2014 | Richter |
| D708,650 S | 7/2014 | Richter |
| 8,790,052 B2 | 7/2014 | Baratta |
| D711,441 S | 8/2014 | Novak et al. |
| 8,840,344 B2 | 9/2014 | Stenman |
| 11,148,212 B2 | 10/2021 | Heath et al. |
| 11,845,134 B2 * | 12/2023 | Heath ................. B23B 51/0467 |
| 12,059,734 B2 * | 8/2024 | Heath ..................... B23B 51/04 |
| 2002/0037201 A1 | 3/2002 | Despres |
| 2003/0103822 A1 | 6/2003 | Wirth et al. |
| 2003/0133765 A1 | 7/2003 | Capriotti |
| 2003/0146024 A1 | 8/2003 | Cramer et al. |
| 2003/0177645 A1 | 9/2003 | Flury et al. |
| 2004/0179911 A1 | 9/2004 | Keightley |
| 2005/0031422 A1 | 2/2005 | Tseng |
| 2005/0105981 A1 | 5/2005 | Byrley et al. |
| 2007/0020056 A1 | 1/2007 | Burdick |
| 2007/0059113 A1 | 3/2007 | Capstran |
| 2007/0160435 A1 | 7/2007 | Chao |
| 2008/0166195 A1 | 7/2008 | Gentry et al. |
| 2008/0181738 A1 | 7/2008 | Capriotti et al. |
| 2008/0187405 A1 | 8/2008 | Nordlin |
| 2009/0035082 A1 | 2/2009 | Singh |
| 2009/0044674 A1 | 2/2009 | Neitzell |
| 2009/0216235 A1 | 8/2009 | Ellis |
| 2009/0222009 A1 | 9/2009 | Ellis |
| 2009/0279972 A1 | 11/2009 | Novak et al. |
| 2009/0326539 A1 | 12/2009 | Neumeyer et al. |
| 2010/0028098 A1 | 2/2010 | Shaffer |
| 2010/0034608 A1 | 2/2010 | Nordlin et al. |
| 2010/0080665 A1 | 4/2010 | Keightley |
| 2010/0086372 A1 | 4/2010 | Werner |
| 2010/0092256 A1 | 4/2010 | Khangar et al. |
| 2010/0145341 A1 | 6/2010 | Ranck et al. |
| 2010/0278601 A1 | 11/2010 | Beynon |
| 2010/0310332 A1 | 12/2010 | Serba |
| 2011/0038679 A1 | 2/2011 | Kozak |
| 2011/0052340 A1 | 3/2011 | Kozak |
| 2011/0073337 A1 | 3/2011 | Milbourne et al. |
| 2011/0170965 A1 | 7/2011 | Novak et al. |
| 2011/0170966 A1 | 7/2011 | Novak et al. |
| 2011/0170967 A1 | 7/2011 | Novak et al. |
| 2011/0170969 A1 | 7/2011 | Novak et al. |
| 2011/0170970 A1 | 7/2011 | Kalomeris et al. |
| 2011/0170971 A1 | 7/2011 | Novak et al. |
| 2011/0170972 A1 | 7/2011 | Zielonka et al. |
| 2012/0155979 A1 | 6/2012 | Khangar et al. |
| 2012/0247834 A1 | 10/2012 | Buxbaum et al. |
| 2014/0023446 A1 | 1/2014 | Piller et al. |
| 2014/0112728 A1 | 4/2014 | Baratta |
| 2014/0158569 A1 | 6/2014 | Green et al. |
| 2014/0271007 A1 | 9/2014 | Richter |
| 2015/0239051 A1 | 8/2015 | Novak et al. |
| 2016/0354846 A1 | 12/2016 | Heffernan |
| 2017/0066064 A1 | 3/2017 | Novak et al. |
| 2017/0157681 A1 | 6/2017 | Parendo et al. |
| 2017/0232530 A1 | 8/2017 | Novak et al. |

(56) References Cited

U.S. PATENT DOCUMENTS

| | | |
|---|---|---|
| 2018/0272441 A1 | 9/2018 | Novak et al. |
| 2020/0282474 A1 | 9/2020 | Bek et al. |
| 2021/0146455 A1 | 5/2021 | Piller |

FOREIGN PATENT DOCUMENTS

| | | |
|---|---|---|
| DE | 2845123 | 4/1980 |
| DE | 3214209 | 10/1983 |
| DE | 9204681 | 8/1992 |
| DE | 29907717 | 8/1999 |
| DE | 20201300 | 7/2003 |
| DE | 20318529 | 4/2005 |
| DE | 102005012026 | 9/2006 |
| EP | 0612575 | 8/1994 |
| EP | 0792705 | 9/1997 |
| EP | 0965407 | 12/1999 |
| EP | 2070618 | 6/2009 |
| EP | 2138255 | 12/2009 |
| GB | 911093 | 11/1962 |
| GB | 1476437 | 6/1977 |
| GB | 2040741 | 9/1980 |
| GB | 1589293 | 5/1981 |
| GB | 2338438 | 12/1999 |
| GB | 2451947 | 2/2009 |
| JP | S5689414 A | 7/1981 |
| JP | S5987338 A | 5/1984 |
| JP | S59131806 | 9/1984 |
| JP | H04171108 | 6/1992 |
| JP | H0525013 | 4/1993 |
| JP | H07124809 A | 5/1995 |
| JP | 3019727 | 1/1996 |
| JP | H09192912 | 7/1997 |
| JP | 2003200415 | 7/2003 |
| JP | 2005-144568 | 6/2005 |
| JP | 2008018490 | 1/2008 |
| KR | 2012039417 | 4/2012 |
| NL | 9400753 | 12/1995 |
| WO | WO9015683 | 12/1990 |
| WO | WO9731743 A1 | 9/1997 |
| WO | WO0009284 | 2/2000 |
| WO | WO2008064409 | 6/2008 |
| WO | WO 2011/088268 | 7/2011 |
| WO | WO2011088269 | 7/2011 |

OTHER PUBLICATIONS

Inter Partes Review No. 2015-01461, "Petition for Inter Partes Review of U.S. Pat. No. 8,579,554", dated Jun. 22, 2015 (56 pages).
Inter Partes Review No. 2015-01461, "Petitioner Exhibit 1002 Declaration of James Pangerc", dated Jun. 22, 2015 (11 pages).
International Search Report and Written Opinion for International Application No. PCT/US2019/041175, dated Oct. 24, 2019, 13 pages.
Makita Industrial Power Tools, 1998-1999 General Catalog (1998) ISO9002, p. 96.
Makita Industrial Power Tools, 2003-2004 General Catalog (2003) 2 pages.

* cited by examiner

HOLE SAW WITH HEX SIDEWALL HOLES

CROSS-REFERENCE TO RELATED PATENT APPLICATIONS

The present application is a continuation of U.S. application Ser. No. 17/495,008, filed on Oct. 6, 2021, which is a continuation of U.S. application Ser. No. 16/518,326, filed Jul. 22, 2019, which issued as U.S. Pat. No. 11,148,212 on Oct. 19, 2021, which is a continuation of International Application No. PCT/US2019/041175, filed Jul. 10, 2019, which claims the benefit of and priority to U.S. Provisional Application No. 62/696,141, filed Jul. 10, 2018, the content of which are incorporated herein by reference in their entireties.

BACKGROUND OF THE INVENTION

The present invention relates generally to the field of tools. The present invention relates specifically to a hole saw having a plurality of sidewall openings. In general, a hole saw includes a cylindrical structure with cutting teeth at one end of the cylinder. In use, the hole saw spins at a high rate of speed, cutting a hole in a work piece that has a size and shape that generally matches the size and shape of the cylindrical structure.

SUMMARY OF THE INVENTION

One embodiment of the disclosure relates to a hole saw including a body, such as a cylindrical saw body, and an end cap. The saw body includes a cutting edge at a first end of the saw body, and a second end of the saw body is coupled to an outer section of the end cap. The cylindrical saw body includes an outer surface and an inner surface defining a hollow internal area. The cylindrical saw body includes a first group of openings extending between the outer surface and the inner surface, a second group of openings extending between the outer surface and the inner surface, and an uninterrupted area located between the first group of openings and the second group of openings. In specific embodiments, the hole saw side wall openings have a non-circular shape and specifically, all of the hole saw side wall openings have a non-circular shape.

In specific embodiments, the first group of openings includes a first opening and a second opening, and the second group of openings includes a first opening and a second opening. In specific embodiments, the first opening and second opening of the first group are spaced from each other in the circumferential direction such that the first opening is not located above the second opening in the longitudinal direction. In a specific embodiment, the first opening and second opening of the second group are spaced from each other in the circumferential direction such that the first opening is not located above the second opening in the longitudinal direction.

Additional features and advantages will be set forth in the detailed description which follows, and in part will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

DETAILED DESCRIPTION

Figure 1:
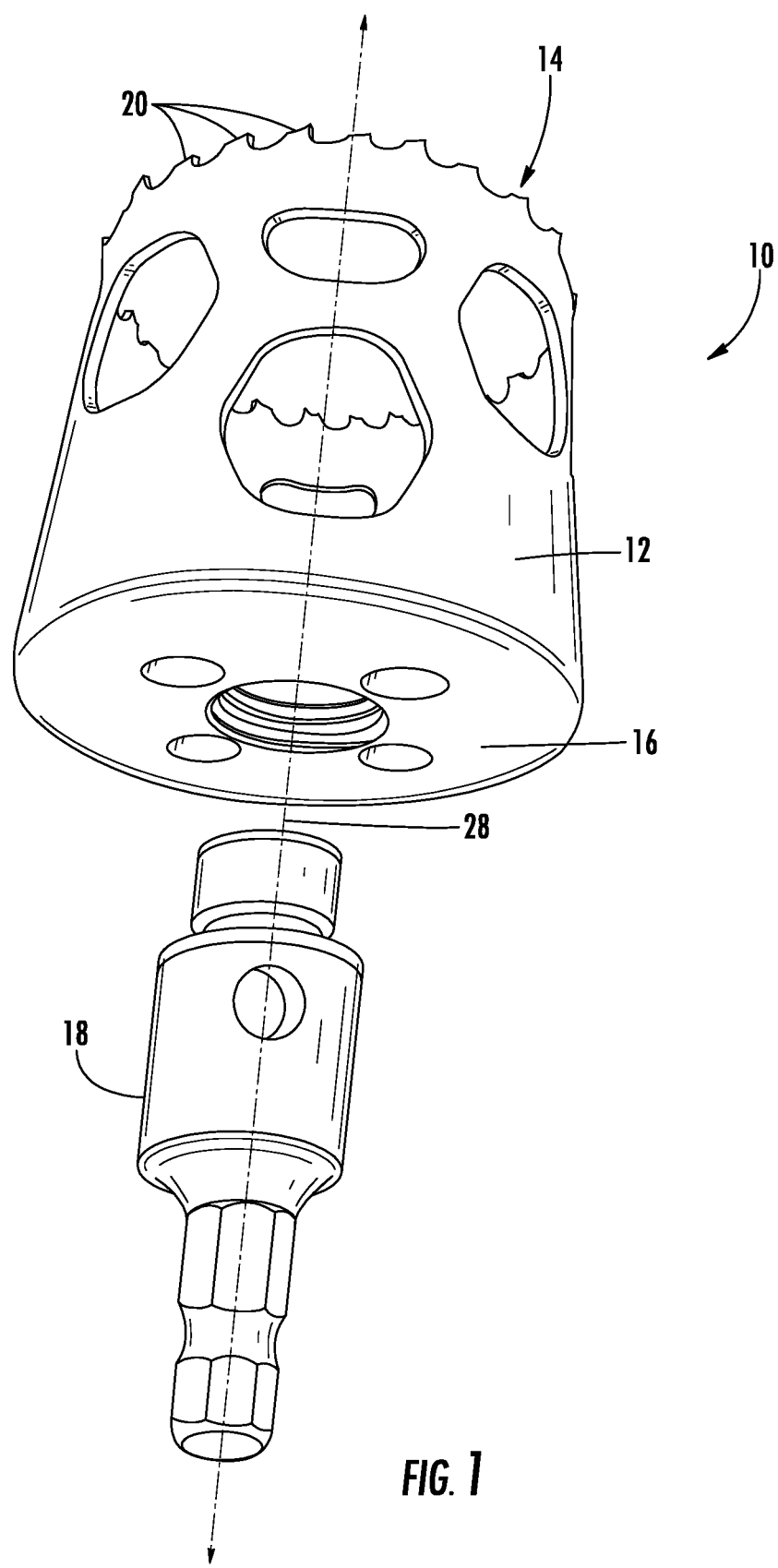
FIG. 1 is a perspective view of a hole saw and arbor, according to an exemplary embodiment.

Referring generally to the figures, various embodiments of a hole cutter or hole saw including a plurality of sidewall openings are shown. In general, a hole saw includes a cylindrical sidewall, a cutting end having cutting teeth at one end of the cylindrical sidewall and an end cap at the other end of the cylindrical sidewall. As will be generally understood, the end cap includes a mounting structure that mounts to a driving device (e.g., a power tool) that drives the hole saw in rotation to cut a hole in a workpiece. In various embodiments, the sidewall of the hole saw discussed herein includes a pattern of multiple sidewall openings strategically positioned and sized to provide improved functionality while still providing sufficient strength to the hole saw. In specific embodiments, the hole saw discussed herein specifically includes side wall openings having non-circular shapes, and in at least some embodiments, Applicant believes that non-circular shaped sidewall openings may allow for improved debris removal through the provision of leverage points or corner.

As will generally be understood, during use of the hole saw, some portion of cut material (e.g., saw dust, chips, a plug of the material being cut, etc.) material enters the central cavity of the hole saw. Some of this material eventually exits the hole saw through the sidewall holes by being ejected during spinning of the hole saw. Other material is manually removed by pushing or prying the material out by insertion of a tool through the sidewall openings. In general and as will be discussed in more detail below, the sidewall openings are positioned in a pattern surrounding the entire circumference of the sidewall such that no matter what position the saw is in when it is spinning, one of the openings is easily accessible by the user for debris removal without further rotation of the saw blade. Further, the sidewall openings are relatively large and numerous allowing the user to conveniently access the interior of the hole saw blade with a tool (e.g., a screw driver) to dig or pry a plug/debris out from the hole saw center. In addition, Applicant believes that because the hole patterns shown herein increase ejection of debris during cutting, the ease of plug removal is increased because there is less saw dust and chips remaining in the interior of the hole saw blocking plug removal.

While generally increasing the size and number of the sidewall holes of the hole saw blade increases ease of access for debris removal, the hole saw sidewall also provides strength and rigidity to the hole saw blade. The sidewall opening designs discussed herein strike a balance between strength and debris removal accessibility that Applicant believes provide higher levels of accessibility and strength than achieved with prior designs. Further, the sidewall opening pattern is arranged such that there are relatively large uninterrupted portions of the sidewall located between hole groupings which increase strength and also provide locations for weld seam location and placement of information (e.g., product information, logos, etc.).

Referring to FIG. 1, a hole saw, such as hole saw 10, is shown according to an exemplary embodiment. Hole saw 10 includes a sidewall, shown as cylindrical body 12, a cutting end 14 at a first end of body 12 and an end cap 16 coupled to the opposite, second end of body 12. In general, end cap 16 is a disc of metal material that may be coupled to body 12 via a coupling structure such as a weld. In various embodiments, end cap 16 includes a central mounting portion for coupling to a tool attachment structure, shown as arbor 18. As will be generally understood, arbor 18 facilitates coupling of hole saw 10 to a driving device (e.g., an impact driver, power drill driver, etc.) which drives hole saw 10 during cutting.

As shown in FIG. 1, cutting end 14 includes a plurality of teeth 20 that extend around cutting end 14. Teeth 20 may be formed in a wide variety of designs for different cutting applications. In specific embodiments, teeth 20 and cylindrical body 12 are formed from a single, contiguous, continuous piece of metal material in which teeth 20 are formed.

Figure 2:
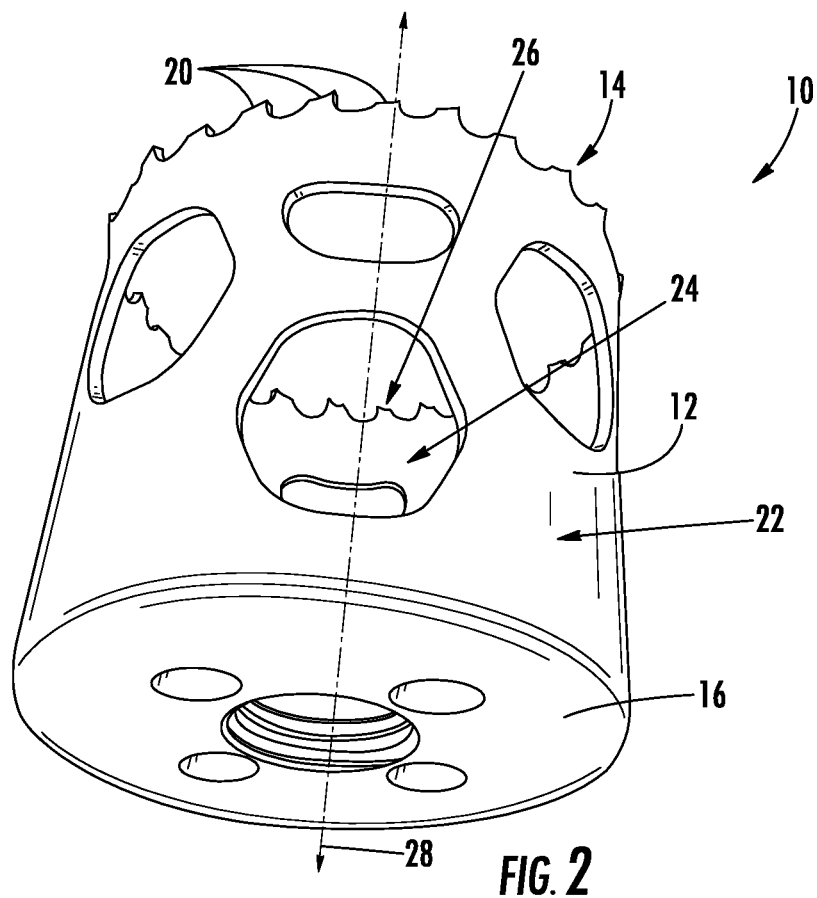
FIG. 2 is a perspective view from below of a hole saw, according to an exemplary embodiment.
Figure 3:
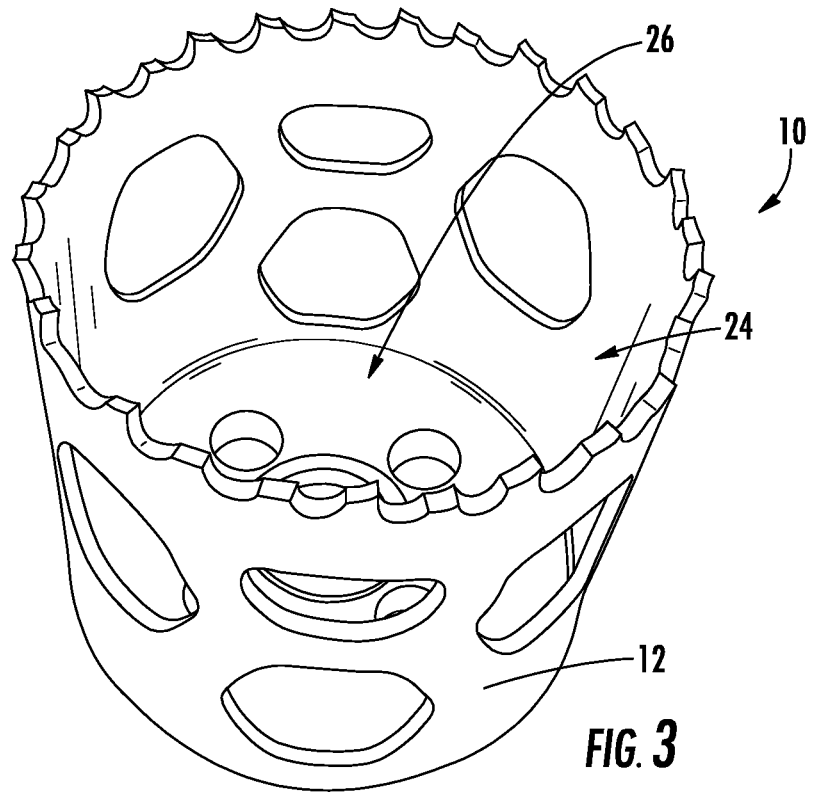
FIG. 3 is a perspective view from above of the hole saw of FIG. 2, according to an exemplary embodiment.
Figure 4:
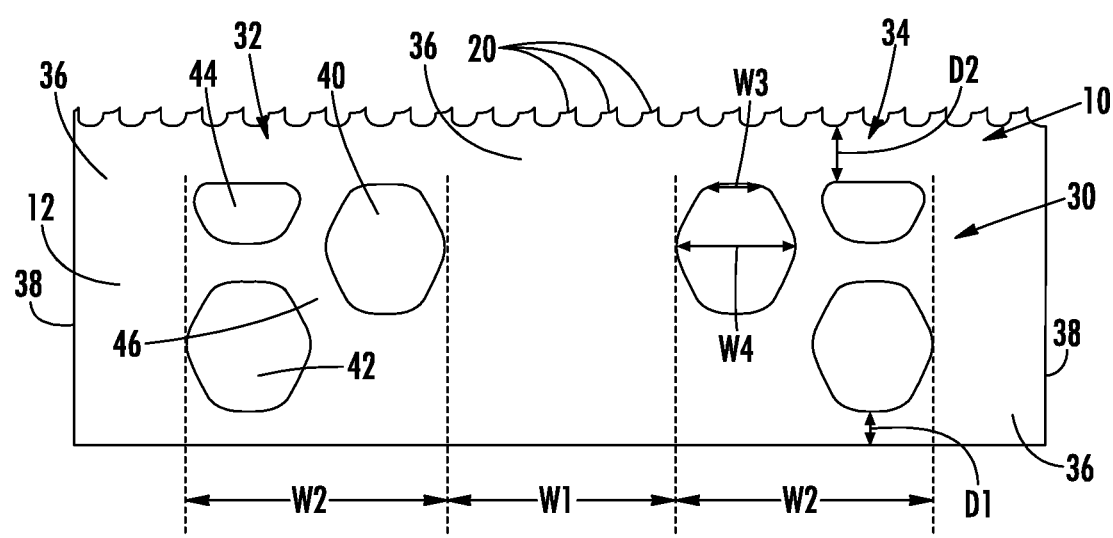
FIG. 4 is a side plan view of the sidewall of the hole saw of FIG. 2 prior to shaping to the cylindrical structure shown in FIG. 2, according to an exemplary embodiment.

Referring to FIGS. 2-4, details of cylindrical body 12 are shown and described. Cylindrical body 12 is a cylindrical wall of material (e.g., metal material) that has an exterior surface 22 and an interior surface 24. Cylindrical body 12 is a substantially hollow cylinder such that a hollow internal area 26 is defined by interior surface 24 of body 12. Hole saw 10 defines a longitudinal axis 28 that extends lengthwise through hole saw 10, perpendicular to end cap 16 and perpendicular to a plane defined by cutting end 14. As will be explained in more detail below, the pattern and geometry of the openings in body 12 discussed herein provide for easy debris removal while also providing a sidewall having sufficiently high strength.

Referring to FIG. 4, body 12 of hole saw 10 is shown prior to shaping to the cylindrical shape shown in FIGS. 2 and 3 to more clearly depict the opening shape and pattern. As noted above, hole saw 10 includes a plurality of openings 30 that are shaped and arranged in a pattern around hole saw 10. In the specific embodiment of FIG. 4, openings 30 are arranged in a first group 32 and a second group 34 with relatively large areas 36 of uninterrupted portions of body 12 located between groups 32 and 34. To form the cylindrical shape of hole saw 10, body 12 is wrapped to a cylindrical shape and free edges 38 of body 12 are welded together to form the cylindrical body shown in FIGS. 2 and 3.

In general, large areas 36 and opening groups 32 and 34 are sized and positioned to provide a variety of functional benefits to hole saw 10. As shown in FIG. 4, hole groups 32 and 34 are evenly spaced circumferentially along body 12 such that when formed to a cylindrical shape, body 12 is substantially symmetrical. Similarly, the solid spaces are also positioned symmetrically around the circumference to provide dynamic balancing. This provides balance to hole saw 10 important to a rotary tool to limit/prevent shaking and vibration during use. In addition, this positioning ensures that one of the opening groups 32 or 34 is generally facing the user regardless of the rotational position when hole saw 10 stops spinning, allowing the user easy access through one of openings 30 into internal area 26 for debris removal.

Still referring to FIG. 4, uninterrupted areas 36 have a circumferential length or width, W1, and each opening group 32 and 34 have a circumferential length or width, W2. As will be understood, the absolute value of W1 and W2 will vary based on the diameter of a particular hole saw and on the number of hole groups located around body 12. In addition, hole saw 10 may include more than two hole groups or hole groups with different numbers of holes as needed for different sized hole saws. However, in specific embodiments, W1 and W2 are substantially equal to each other, and specifically are within 50%, more specifically within 30%, and even more specifically within 20% of each other. Applicant has found that this relative sizing between uninterrupted areas 36 and opening groups 32 and 34 provides balance, sufficient strength and easy debris removal access to hollow internal area 26. Further, this relative sizing ensures that uninterrupted areas 36 are also large enough to provide areas to place logos or product information.

In various embodiments, each opening group includes a plurality of openings that are distributed both in the circumferential/width direction and in the longitudinal direction. In general, Applicant has found that an arrangement including multiple openings within each opening group 32 and 34 provides sufficient interior access for debris removal while also ensuring sufficient metal material is located within the area including the hole group to provide structural support to the hole saw. In addition to debris removal, in at least some of the embodiments discussed herein, hole saw 10 includes two or more hole groups extending around at least 50% of the circumference of hole saw 10. In other words, in such arrangements, the sum of W2 for all hole groups is greater than 50% of the circumference of hole saw 10. Such hole patterns allow for chip ejection around at least 50% of the circumference of the hole saw. Because chips are developed all around the circumference of the hole saw during cutting, the hole patterns discussed herein provide areas for chip ejection around a significant portion of the hole saw circumference, which is believed to improve hole saw performance.

In the specific embodiment shown in FIG. 4, each opening group 32 and 34 includes three openings, opening 40, opening 42 and opening 44. In this particular arrangement, openings 40 and 42 have the same shape as each other. Opening 40 is located closer to cutting teeth 20 than opening 42, and openings 40 and 42 are offset from each other in the circumferential/width direction such that an uninterrupted portion 46 of body 12 is located in the width direction between openings 40 and 42. In this arrangement, no portion of opening 40 is located between opening 42 and the cutting teeth in the longitudinal direction. In the specific embodiment shown, openings 40 and 42 are hexagonal in shape.

Opening 44 is smaller than both openings 40 and 42. In the specific embodiment shown, opening 44 has a shape that matches the shape of a lower portion of openings 40 and 42. Opening 44 is aligned with opening 42 in the longitudinal direction, and is located between cutting teeth 20 and opening 42. Applicant has found that by providing openings of various shapes and positioning within each opening group easy debris removal access to interior 26 is provided. In alternative embodiments, opening groups 32 and 34 do not include the smaller opening 44, and only include openings 40 and 42.

Specifically, within each opening group 32 and 34, Applicant has determined that a ratio of open area to solid area relates to the balance between debris removal and strength. In specific embodiments, the total area of opening groups is determined by W2 times the longitudinal length of body 12, where W2 is the circumferential length or width measured between widest lateral edges of openings within the group. In various embodiments, the ratio of the area of openings within each group to the total group area is between 20% and 80% and more specifically is between 40% and 60%.

In addition to the shape and distribution within each opening group, openings 40, 42 and 44 are sized and shaped to allow for easy insertion of a tool (e.g., a screw driver) through the openings to facilitate removing or prying of a plug or other cutting debris from interior 26. Thus, the upper and lower edges of openings 40, 42 and/or 44 having a circumferential length or width, W3, that is large enough to permit insertion of a standard flat head screw driver. Openings 40, 42 and 44 are also shaped such that their width dimension increases to circumferential length or width, W4, that is greater than W3. In various embodiments, W4 is between 125% of W3 and 300% of W3 and specifically W4 is two times W3. In a specific embodiment, W3 is between 0.25 inches and 0.5 inches.

In various embodiments, hole groups 32 and 34 are positioned relative to cutting teeth 20 and to end cap 16 to improve performance of hole saw 10. For example, the lowest edge of the lowest hole of each hole group is spaced a short distance D1 from the weld joining end cap 16 to body 12. For example, D1 is a small distance to allow a tool to be inserted behind debris located adjacent end cap 16 within hole saw 10 to facilitate removal of the debris. In specific embodiments, D1 is between $1/16^{th}$ of an inch and $1/2$ inch, specifically is between $2/16^{th}$ of an inch and $4/16^{th}$ of an inch and more specifically is $3/16^{th}$ of an inch.

As another example, the highest edge of the highest hole of each hole group is spaced a distance D2 from the valley or gullet between adjacent cutting teeth. In general, Applicant has determined that if D2 is too small the cutting teeth can be damaged or experience high wear during use and/or an undesirable degree of heat can be built up at the cutting edge of the hole saw. In specific embodiments, D2 is between $1/32^{nd}$ of an inch and 1 inch, specifically is between $1/32^{nd}$ inch and $3/16^{th}$ of an inch and more specifically is $1/4^{th}$ of an inch.

Figure 5:
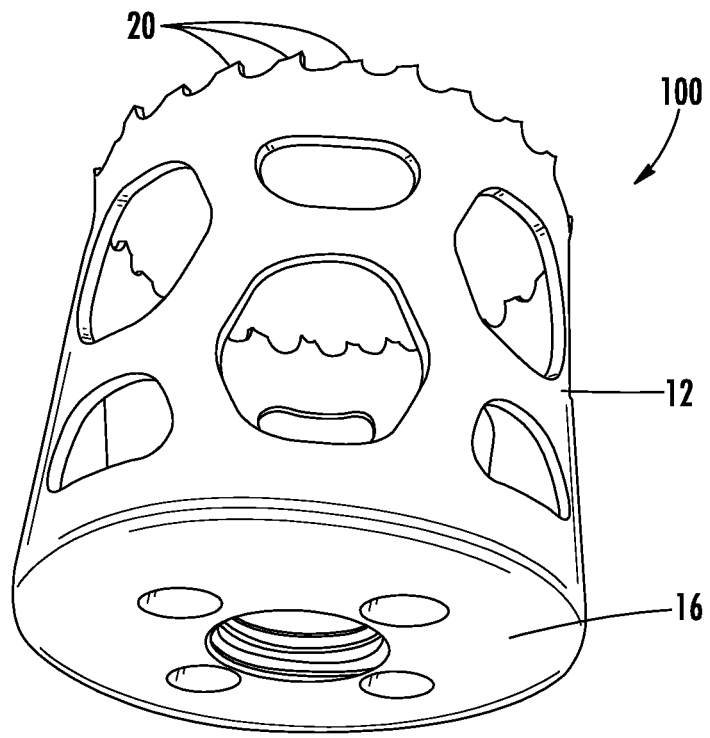
FIG. 5 is a perspective view from below of a hole saw, according to another exemplary embodiment.
Figure 6:
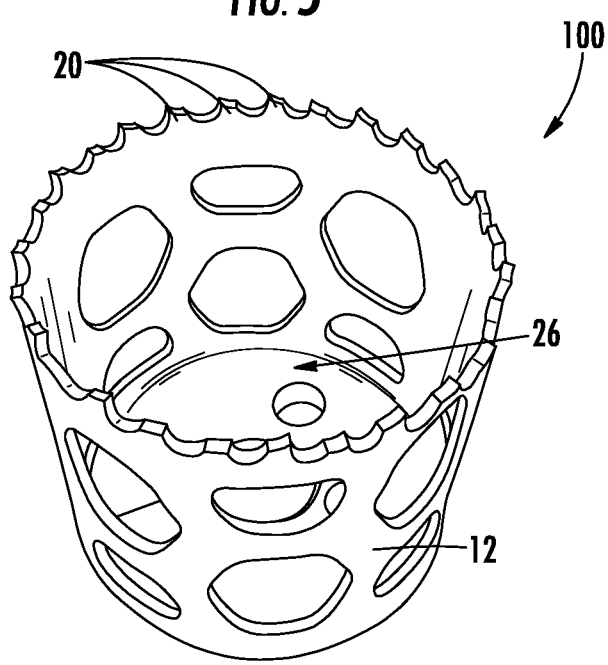
FIG. 6 is a perspective view from above of the hole saw of FIG. 5, according to exemplary embodiment.
Figure 7:
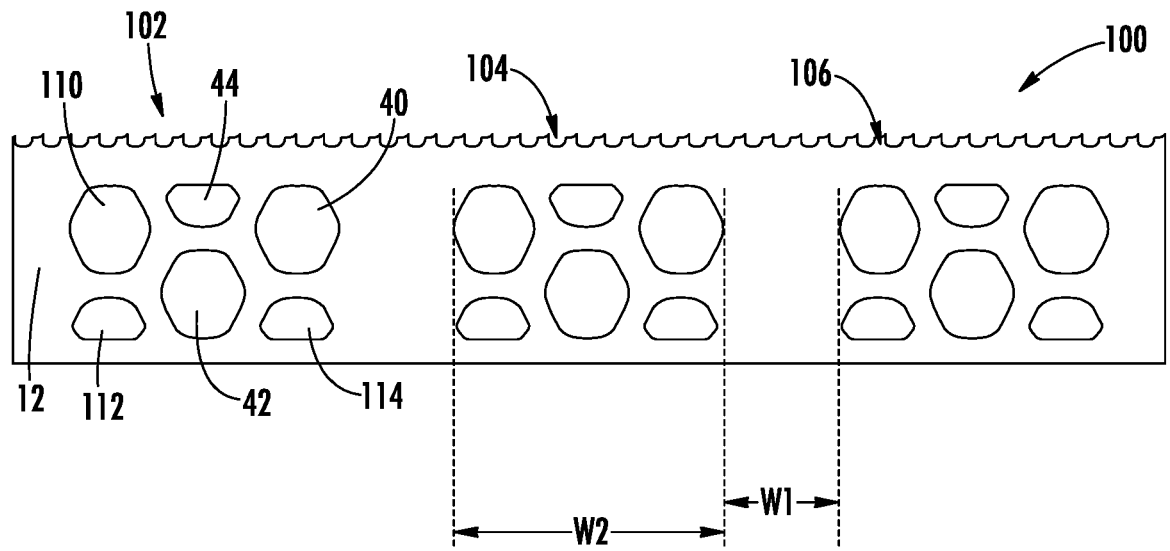
FIG. 7 is a side plan view of the sidewall of the hole saw of FIG. 5 prior to shaping to the cylindrical structure shown in FIG. 5, according to an exemplary embodiment.

Referring to FIGS. 5-7, a hole saw 100 is shown according to an exemplary embodiment. Hole saw 100 is substantially the same as hole saw 10 except for the differences discussed herein. In general, hole saw 100 includes more opening groups and more openings within each group than hole saw 10. In specific embodiments, hole saw 100 has a larger diameter than hole saw 10 with the increased number of holes accounting for the larger size.

As shown in FIG. 7, hole saw 100 includes three opening groups, groups 102, 104 and 106. Each opening group 102, 104 and 106 is separated from adjacent groups via uninterrupted areas 36. Groups 102, 104 and 106 are substantially evenly spaced such that one group is located within each 120 degree section around the circumference of hole saw 100.

Each opening group 102, 104 and 106 has six openings rather than the three opening groups of hole saw 10. In particular, in addition to openings 40, 42 and 44, each group 102, 104 and 106 include openings 110, 112 and 114. As can be seen in FIG. 7, opening 110 has the same shape as openings 40 and 42 and is aligned with opening 40 in the circumferential direction and is spaced from both openings 40 and 42 in the circumferential/width direction.

Openings 112 and 114 have the same shape as opening 44. Openings 112 and 114 are located further from cutting teeth 20 than opening 44. Further, opening 112 is located on one side of opening 42 in the circumferential/width direction and opening 114 is located on the other side of opening 42 in the circumferential/width direction. In the specific embodiment shown, opening 112 is aligned with opening 110 in the longitudinal direction and is located between opening 110 and end cap 16. Similarly, in the specific embodiment shown, opening 114 is aligned with opening 40 in the longitudinal direction and is located between opening 40 and end cap 16.

In various embodiments, the number of opening groups located around the hole saw body changes based on the size of the hole saw. In various embodiments, the number of openings within each opening group and/or the size of each opening increase as the size of the hole saw increases. In a specific embodiment both the number of hole groups and the relative width of the hole group, W2, to the width of the solid space, W1, increases as the diameter of the hole saw increases. In specific embodiments, a three inch diameter hole saw includes three hole groups and three space solid areas. In specific embodiments, a four inch diameter hole saw includes four hole groups and four space solid areas. In addition, as shown in the embodiment of FIG. 7, W2 is greater than W1 and specifically is between 1 and 2 times W1. In some embodiments, W2 is greater than W1, specifically W2 is greater than 1.5 times W1, greater than 2.5 times W1 or greater than 3 times W1. In a specific embodiment, the diameter of the hole saw is six inches and W2 is 3.5 times W1.

Figure 8:
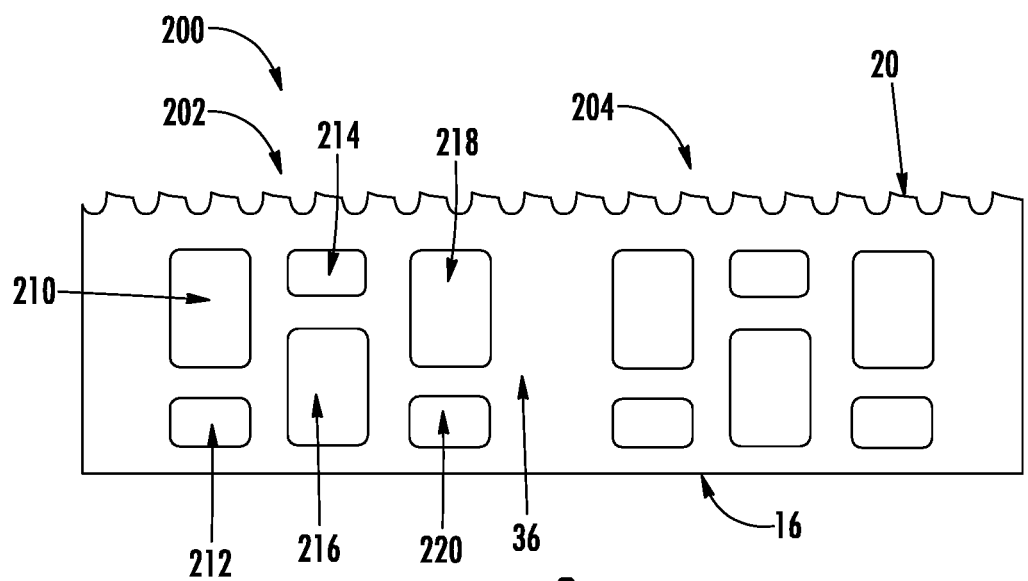
FIG. 8 is a side plan view of the sidewall of a hole saw prior to shaping to a cylindrical structure, according to an exemplary embodiment.

Referring to FIG. 8, a hole saw 200 is shown according to an exemplary embodiment. Hole saw 200 is substantially the same as hole saw 10 and hole saw 100 except for the differences discussed herein. In general, hole saw 200 includes the same number of opening groups as hole saw 10 and the same number of openings within each opening group as hole saw 100.

As shown in FIG. 8, hole saw 200 includes two opening groups, groups 202 and 204. Each opening group 202 and 204 is separated from adjacent opening groups via uninterrupted areas 36. Opening groups 202 and 204 are evenly spaced such that one opening group is located within each 180 degree section around the circumference of hole saw 200.

Each opening group 202 and 204 has six openings, similar to hole saw 100. In particular, each opening group 202 and 204 includes openings 210, 212, 214, 216, 218, and 220. As can be seen in FIG. 8, opening 210 has a shape of a first rectangle. Openings 216 and 218 have the same shape as opening 210. Opening 212 has a shape of a second rectangle, with a smaller height than, and a same width as, the first rectangle. Openings 214 and 220 have the same shape as opening 212. Opening 210 is aligned with opening 218 in the circumferential direction and is spaced from both openings 216 and 218 in the circumferential/width direction. Openings 212, 216, and 220 are located further from cutting teeth 20 than openings 210, 214, and 218.

Further, opening 210 is located on one side of opening 214 in the circumferential/width direction, and opening 218 is located on the other side of opening 214 in the circumferential/width direction. Similarly, opening 212 is located on one side of opening 216 in the circumferential/width direction, and opening 220 is located on the other side of opening 216 in the circumferential/width direction. In the specific embodiment shown, opening 212 is aligned with opening 210 in the longitudinal direction and is located between opening 210 and endcap 16. Similarly, in the specific embodiment shown, opening 216 is aligned with opening 214 in the longitudinal direction and is located between opening 214 and endcap 16. Similarly, in the specific embodiment shown, opening 220 is aligned with opening 218 in the longitudinal direction and is located between opening 218 and endcap 16.

Figure 9:
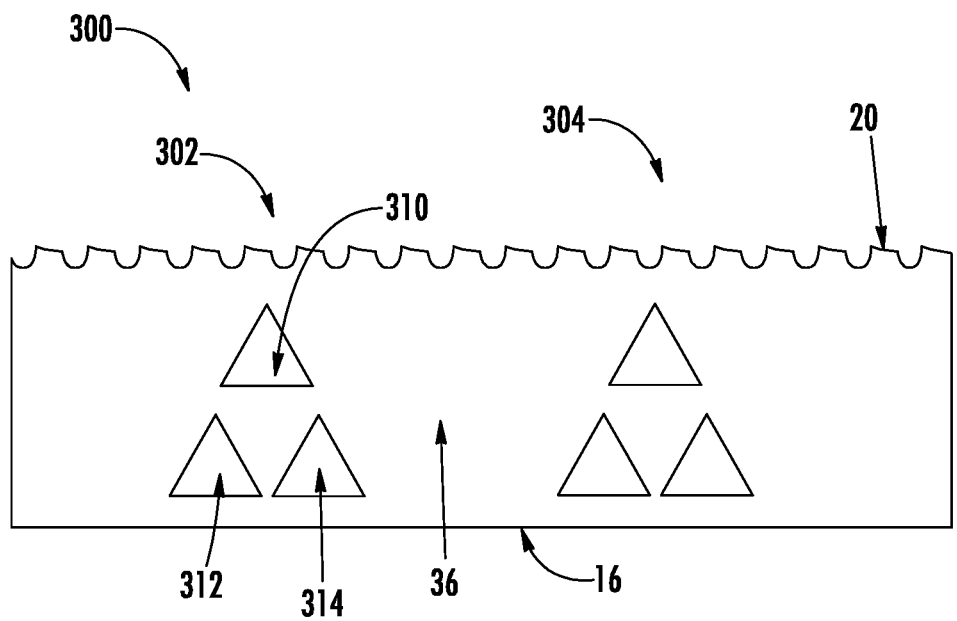
FIG. 9 is a side plan view of the sidewall of a hole saw prior to shaping to a cylindrical structure, according to an exemplary embodiment.

Referring to FIG. 9, a hole saw 300 is shown according to an exemplary embodiment. Hole saw 300 is substantially the same as hole saw 10 except for the differences discussed herein. In general, hole saw 300 includes the same number of opening groups, and the same number of openings within each opening group, as hole saw 10.

As shown in FIG. 9, hole saw 300 includes two opening groups, groups 302 and 304. Each opening group 302 and 304 is separated from adjacent opening groups via uninterrupted areas 36. Opening groups 302 and 304 are evenly spaced such that one opening group is located within each 180 degree section around the circumference of hole saw 300.

Each opening group 302 and 304 has three openings. In particular, each opening group 302 and 304 includes openings 310, 312, and 314. As can be seen in FIG. 9, opening 310 has a shape of a triangle. Openings 312 and 314 have the same shape as opening 310. In a specific embodiment, openings 310, 312, and 314 each have a shape of an equilateral triangle. Opening 312 is aligned with opening 314 in the circumferential/width direction and is spaced from both openings 310 and 314 in the circumferential/width direction. Openings 312 and 314 are located further from cutting teeth 20 than is opening 310.

In the specific embodiment shown, openings 310, 312, and 314 each has an apex point facing towards cutting teeth 20. The apex point of opening 310 is positioned midway between the apex points of openings 312 and 314. Opening 310 is aligned in the longitudinal direction with openings 312 and 314. Openings 312 and 314 are located between opening 310 and endcap 16.

Figure 10:
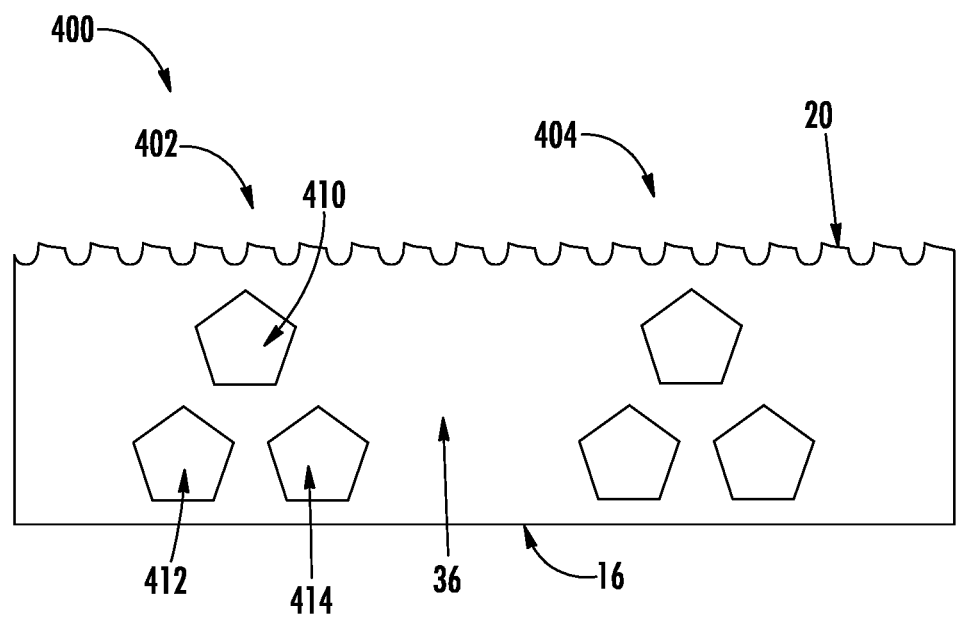
FIG. 10 is a side plan view of the sidewall of a hole saw prior to shaping to a cylindrical structure, according to an exemplary embodiment.

Referring to FIG. 10, a hole saw 400 is shown according to an exemplary embodiment. Hole saw 400 is substantially the same as hole saw 10 except for the differences discussed herein. In general, hole saw 400 includes the same number of opening groups, and the same number of openings within each opening group, as hole saw 10.

As shown in FIG. 10, hole saw 400 includes two opening groups, groups 402 and 404. Each opening group 402 and 404 is separated from adjacent opening groups via uninterrupted areas 36. Opening groups 402 and 404 are evenly spaced such that one opening group is located within each 180 degree section around the circumference of hole saw 400.

Each opening group 402 and 404 has three openings. In particular, each opening group 402 and 404 includes openings 410, 412, and 414. As can be seen in FIG. 10, opening 410 has a shape of a pentagon. Openings 412 and 414 have the same shape as opening 410. In a specific embodiment, openings 410, 412, and 414 each have a shape of an equilateral pentagon. Opening 412 is aligned with opening 414 in the circumferential/width direction and is spaced from both openings 410 and 414 in the circumferential/width direction. Openings 412 and 414 are located further from cutting teeth 20 than opening 410.

In the specific embodiment shown, openings 410, 412, and 414 each has an apex point facing towards cutting teeth 20. The apex point of opening 410 is positioned midway between the apex points of openings 412 and 414. Opening 410 is aligned in the longitudinal direction with openings 412 and 414. Openings 412 and 414 are located between opening 410 and endcap 16.

Figure 11:
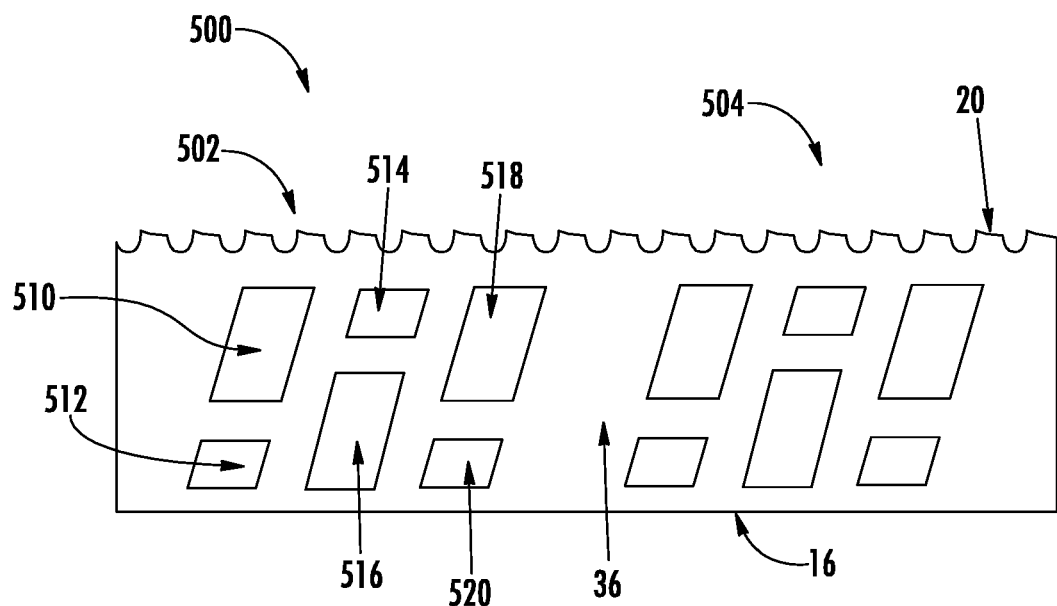
FIG. 11 is a side plan view of the sidewall of a hole saw prior to shaping to a cylindrical structure, according to an exemplary embodiment.

Referring to FIG. 11, a hole saw 500 is shown according to an exemplary embodiment. Hole saw 500 is substantially the same as hole saw 10 and hole saw 100 except for the differences discussed herein. In general, hole saw 500 includes the same number of opening groups as hole saw 10 and the same number of openings within each opening group as hole saw 100.

As shown in FIG. 11, hole saw 500 includes two opening groups, groups 502 and 504. Each opening group 502 and 504 is separated from adjacent opening groups via uninterrupted areas 36. Opening groups 502 and 504 are evenly spaced such that one opening group is located within each 180 degree section around the circumference of hole saw 500.

Each opening group 502 and 504 has six openings, similar to hole saw 100. In particular, each opening group 502 and 504 includes openings 510, 512, 514, 516, 518, and 520. As can be seen in FIG. 11, opening 510 has a shape of a first parallelogram leaning upwards and right. In a specific embodiment, opening 510 has a shape of a first rhomboid. Openings 516 and 518 have the same shape as opening 510. Opening 512 has a shape of a second parallelogram leaning upwards and right, with a same width and a smaller height than the first parallelogram. In a specific embodiment, opening 512 has a shape of a second rhomboid. Openings 514 and 520 have the same shape as opening 512. Opening 510 is aligned with opening 518 in the circumferential direction and is spaced from both openings 516 and 518 in the circumferential/width direction. Openings 512, 516, and 520 are located further from cutting teeth 20 than are openings 510, 514, and 518.

Further, opening 510 is located on one side of opening 514 in the circumferential/width direction, and opening 518 is located on the other side of opening 514 in the circumferential/width direction. Similarly, opening 512 is located on one side of opening 516 in the circumferential/width direction, and opening 520 is located on the other side of opening 516 in the circumferential/width direction. In the specific embodiment shown, opening 512 is aligned with opening 510 in a diagonal direction of hole saw 500 and is located between opening 510 and endcap 16. Similarly, in the specific embodiment shown, opening 516 is aligned with opening 514 in the same diagonal direction as openings 510 and 512, and is located between opening 514 and endcap 16. Similarly, in the specific embodiment shown, opening 520 is aligned with opening 518 in the same diagonal direction as openings 510 and 512, and is located between opening 518 and endcap 16.

Figure 12:
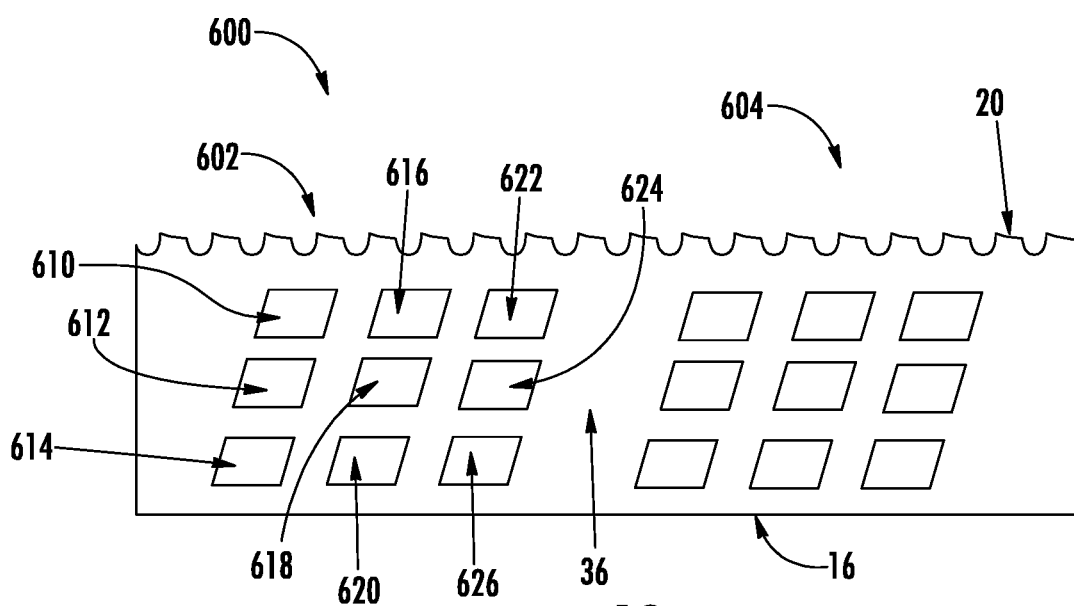
FIG. 12 is a side plan view of the sidewall of a hole saw prior to shaping to a cylindrical structure, according to an exemplary embodiment.

Referring to FIG. 12, a hole saw 600 is shown according to an exemplary embodiment. Hole saw 600 is substantially the same as hole saw 10 and hole saw 100 except for the differences discussed herein. In general, hole saw 600 includes the same number of opening groups as hole saw 10 and more openings within each opening group than both hole saw 10 and hole saw 100.

As shown in FIG. 12, hole saw 600 includes two opening groups, groups 602 and 604. Each opening group 602 and 604 is separated from adjacent opening groups via uninterrupted areas 36. Opening groups 602 and 604 are evenly spaced such that one opening group is located within each 180 degree section around the circumference of hole saw 600.

Each opening group 602 and 604 has nine openings, rather than the three openings of hole saw 10 or the six openings of hole saw 100. In particular, each opening group 602 and 604 includes openings 610, 612, 614, 616, 618, 620, 622, 624, and 626. As can be seen in FIG. 12, opening 610 has a shape of a parallelogram leaning upwards and right. In a specific embodiment, opening 610 has a shape of a rhomboid. Openings 612, 614, 616, 618, 620, 622, 624, and 626 have the same shape as opening 610. Opening 610 is aligned with openings 616 and 622 in the circumferential direction and is spaced from both openings 612 and 616 in the circumferential/width direction. Openings 610, 616, and 622 are located nearest the cutting teeth 20. Openings 612, 618, and 624 are located midway respectively between openings 610, 616, and 622 and openings 614, 620, and 626, which are nearest the endcap 16.

Further, opening 610 is located on one side of opening 616 in the circumferential/width direction, and opening 622 is located on the other side of opening 616 in the circumferential/width direction. Similarly, opening 612 is located on one side of opening 618 in the circumferential/width direction, and opening 624 is located on the other side of opening 618 in the circumferential/width direction. Similarly, opening 614 is located on one side of opening 620 in the circumferential/width direction, and opening 626 is located on the other side of opening 620 in the circumferential/width direction. In the specific embodiment shown, openings 612 and 614 are aligned with opening 610 in a diagonal direction of hole saw 600. Similarly, in the specific embodiment shown, openings 618 and 620 is aligned with opening 616 in the same diagonal direction as openings 610, 612, and 614. Similarly, in the specific embodiment shown, openings 624 and 626 are aligned with opening 622 in the same diagonal direction as openings 610, 612, and 614.

Figure 13:
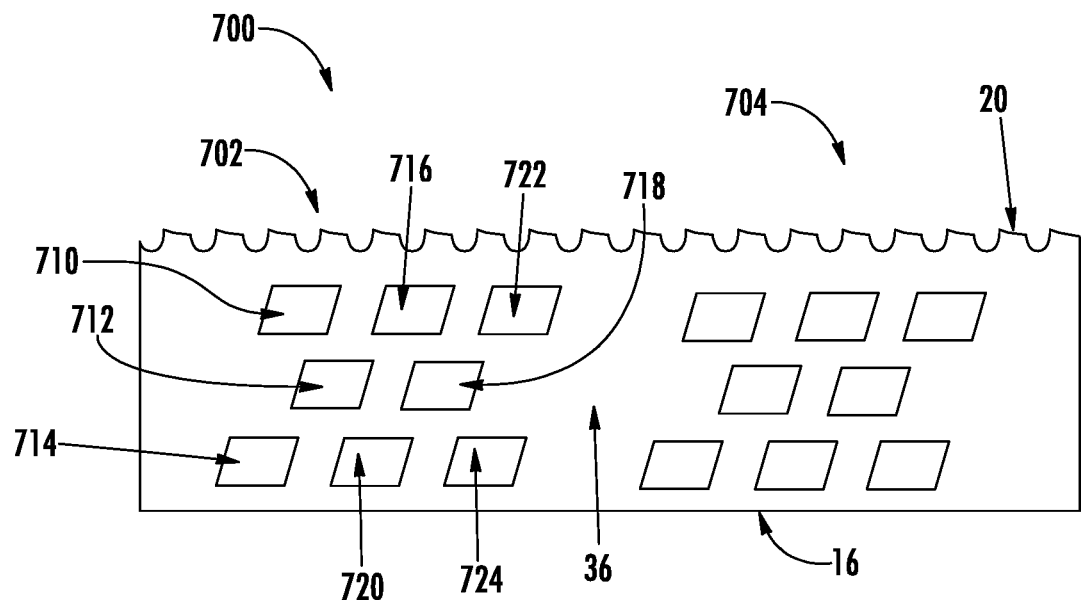
FIG. 13 is a side plan view of the sidewall of a hole saw prior to shaping to a cylindrical structure, according to an exemplary embodiment.

Referring to FIG. 13, a hole saw 700 is shown according to an exemplary embodiment. Hole saw 700 is substantially the same as hole saw 10 and hole saw 100 except for the differences discussed herein. In general, hole saw 700 includes the same number of opening groups as hole saw 10 and more openings within each opening group than both hole saw 10 and hole saw 100.

As shown in FIG. 13, hole saw 700 includes two opening groups, groups 702 and 704. Each opening group 702 and 704 is separated from adjacent opening groups via uninterrupted areas 36. Opening groups 702 and 704 are evenly spaced such that one opening group is located within each 180 degree section around the circumference of hole saw 700.

Each opening group 702 and 704 has eight openings, rather than the three openings of hole saw 10 or the six openings of hole saw 100. In particular, each opening group 702 and 704 includes openings 710, 712, 714, 716, 718, 720, 722, and 724. As can be seen in FIG. 13, opening 710 has a shape of a parallelogram leaning upwards and right. In a specific embodiment, opening 710 has a shape of a rhomboid. Openings 710, 712, 714, 716, 718, 720, 722, and 724 have the same shape as opening 710. Opening 710 is aligned with openings 716 and 722 in the circumferential/width direction. Openings 710, 716, and 722 are located nearest the cutting teeth 20. Openings 712 and 718 are located along the longitudinal direction midway between openings 710, 716, and 722 and openings 714, 720, and 724, which are nearest the endcap 16. Openings 712 and 718 are staggered midway centrally along the circumference of hole saw 700 between openings 710, 716, and 722 and openings 714, 720, and 724.

Further, opening 710 is located on one side of opening 716 in the circumferential/width direction, and opening 722 is located on the other side of opening 716 in the circumferential/width direction. Similarly, opening 714 is located on one side of opening 720 in the circumferential/width direction, and opening 724 is located on the other side of opening 720 in the circumferential/width direction. In the specific embodiment shown, opening 714 is aligned with opening 710 in a diagonal direction of hole saw 700. Similarly, in the specific embodiment shown, opening 716 is aligned with opening 720 in the same diagonal direction as openings 710 and 714. Similarly, in the specific embodiment shown, opening 722 is aligned with opening 724 in the same diagonal direction as openings 710 and 714.

Figure 14:
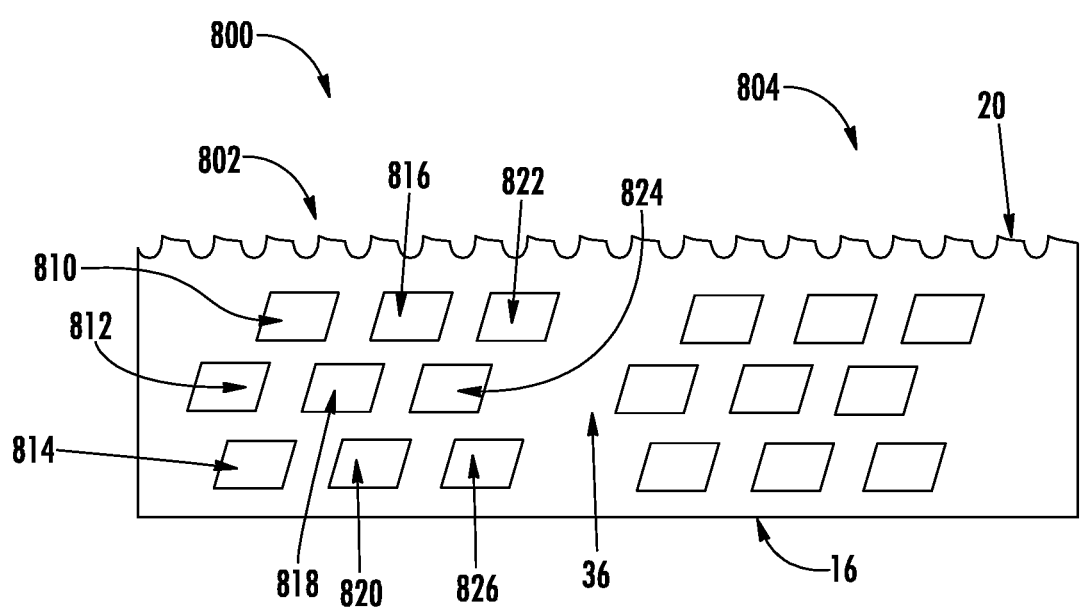
FIG. 14 is a side plan view of the sidewall of a hole saw prior to shaping to a cylindrical structure, according to an exemplary embodiment.

Referring to FIG. 14, a hole saw 800 is shown according to an exemplary embodiment. Hole saw 800 is substantially the same as hole saw 10 and hole saw 100 except for the differences discussed herein. In general, hole saw 800 includes the same number of opening groups as hole saw 10 and more openings within each opening group than both hole saw 10 and hole saw 100.

As shown in FIG. 14, hole saw 800 includes two opening groups, groups 802 and 804. Each opening group 802 and 804 is separated from adjacent opening groups via uninterrupted areas 36. Opening groups 802 and 804 are evenly spaced such that one opening group is located within each 180 degree section around the circumference of hole saw 800.

Each opening group 802 and 804 has nine openings, rather than the three openings of hole saw 10 or the six openings of hole saw 100. In particular, each opening group 802 and 804 includes openings 810, 812, 814, 816, 818, 820, 822, 824, and 826. As can be seen in FIG. 14, opening 810 has a shape of a parallelogram leaning upwards and right. In a specific embodiment, opening 810 has a shape of a rhomboid. Openings 812, 814, 816, 818, 820, 822, 824, and 826 have the same shape as opening 810. Opening 810 is aligned with openings 816 and 822 in the circumferential/width. Openings 810, 816, and 822 are located nearest the cutting teeth 20. Openings 812, 818, and 824 are located midway respectively between openings 810, 816, and 822 and openings 814, 820, and 826, which are nearest the endcap 16. Openings 812, 818, and 824 are staggered midway to the left along the circumference of hole saw 800 between openings 810, 816, and 822 and openings 814, 820, and 826.

Further, opening 810 is located on one side of opening 816 in the circumferential/width direction, and opening 822 is located on the other side of opening 816 in the circumferential/width direction. Similarly, opening 812 is located on one side of opening 818 in the circumferential/width direction, and opening 824 is located on the other side of opening 818 in the circumferential/width direction. Similarly, opening 814 is located on one side of opening 820 in the circumferential/width direction, and opening 826 is located on the other side of opening 820 in the circumferential/width direction. In the specific embodiment shown, opening 814 is aligned with opening 810 in a diagonal direction of hole saw 800. Similarly, in the specific embodiment shown, opening 820 is aligned with opening 816 in the same diagonal direction as openings 810 and 814. Similarly, in the specific embodiment shown, opening 826 is aligned with opening 822 in the same diagonal direction as openings 810 and 814.

Figure 15:
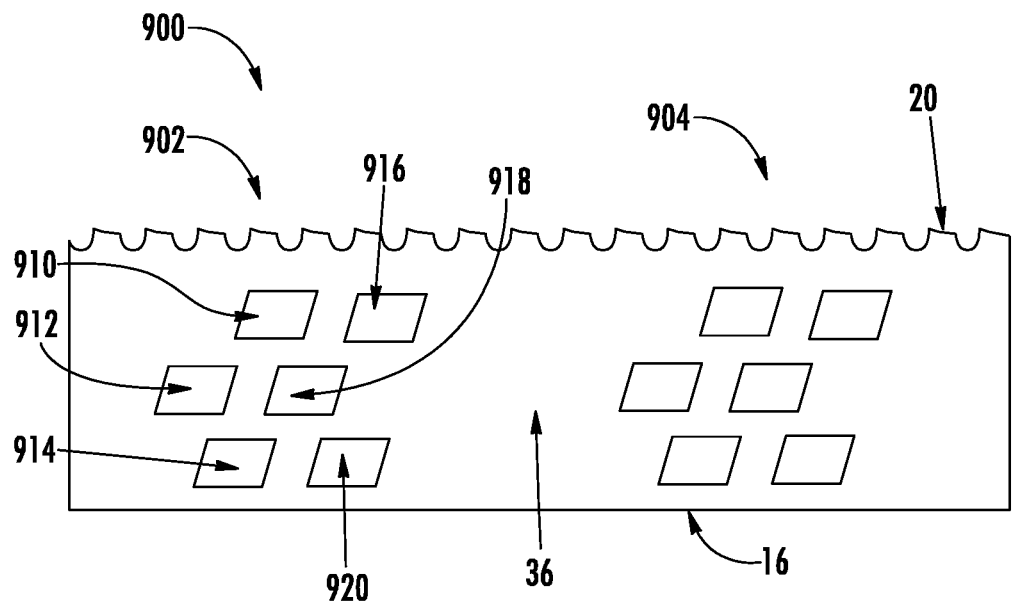
FIG. 15 is a side plan view of the sidewall of a hole saw prior to shaping to a cylindrical structure, according to an exemplary embodiment.

Referring to FIG. 15, a hole saw 900 is shown according to an exemplary embodiment. Hole saw 900 is substantially the same as hole saw 10 and hole saw 100 except for the differences discussed herein. In general, hole saw 900 includes the same number of opening groups as hole saw 10 and the same number of openings within each opening group as hole saw 100.

As shown in FIG. 15, hole saw 900 includes two opening groups, groups 902 and 904. Each opening group 902 and 904 is separated from adjacent opening groups via uninterrupted areas 36. Opening groups 902 and 904 are evenly spaced such that one opening group is located within each 180 degree section around the circumference of hole saw 900.

Each opening group 902 and 904 has six openings, rather than the three openings of hole saw 10. In particular, each opening group 902 and 904 includes openings 910, 912, 914, 916, 918, and 920. As can be seen in FIG. 15, opening 910 has a shape of a parallelogram leaning upwards and right. In a specific embodiment, opening 910 has a shape of a rhomboid. Openings 910, 912, 914, 916, 918, and 920 have the same shape as opening 910. Opening 910 is aligned with opening 916 in the circumferential/width direction. Openings 910 and 916 are located nearest the cutting teeth 20. Openings 912 and 918 are located midway respectively between openings 910 916 and openings 914 and 920, which are nearest the endcap 16. Openings 912 and 918 are staggered midway to the left along the circumference of hole saw 900 between openings 910 and 916 and openings 914 and 920.

In the specific embodiment shown, opening 914 is aligned with opening 910 in a diagonal direction of hole saw 900. Similarly, in the specific embodiment shown, opening 920 is aligned with opening 916 in the same diagonal direction as openings 910 and 914.

Figure 16:
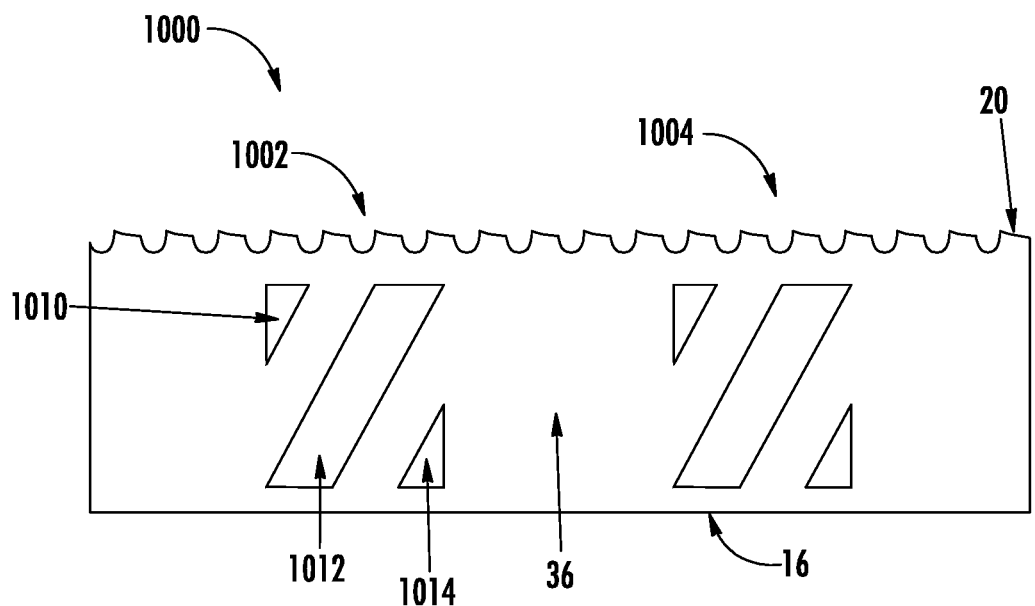
FIG. 16 is a side plan view of the sidewall of a hole saw prior to shaping to a cylindrical structure, according to an exemplary embodiment.

Referring to FIG. 16, a hole saw 1000 is shown according to an exemplary embodiment. Hole saw 1000 is substantially the same as hole saw 10 except for the differences discussed herein. In general, hole saw 1000 includes the same number of opening groups, and the same number of openings within each opening group, as hole saw 10.

As shown in FIG. 16, hole saw 1000 includes two opening groups, groups 1002 and 1004. Each opening group 1002 and 1004 is separated from adjacent opening groups via uninterrupted areas 36. Opening groups 1002 and 1004 are evenly spaced such that one opening group is located within each 180 degree section around the circumference of hole saw 1000.

Each opening group 1002 and 1004 has three openings. In particular, each opening group 1002 and 1004 includes openings 1010, 1012, and 1014. As can be seen in FIG. 16, opening 1010 has a shape of a triangle. In a specific embodiment, opening 1010 has a shape of a scalene triangle. Opening 1014 has the same shape as opening 1010. Opening 1010 is positioned nearest the cutting teeth 20, and has a base facing the cutting teeth 20, and an apex point facing endcap 16. Opening 1010 has a hypotenuse facing opening 1012. Opening 1014 is positioned nearest endcap 16, and has a base facing endcap 16, and an apex point facing the cutting teeth 20. Opening 1014 has a hypotenuse facing opening 1012. Neither opening 1010 nor opening 1014 extends along the full longitudinal direction of hole saw 1000. Opening 1012 has a shape of a parallelogram leaning upwards and right. In a specific embodiment, opening 1012 has a shape of a rhomboid. Opening 1012 extends fully along a diagonal direction of hole saw 1000. Opening 1010 is located on one side of opening 1012, and opening 1014 is located on the other side of opening 1012.

Figure 17:
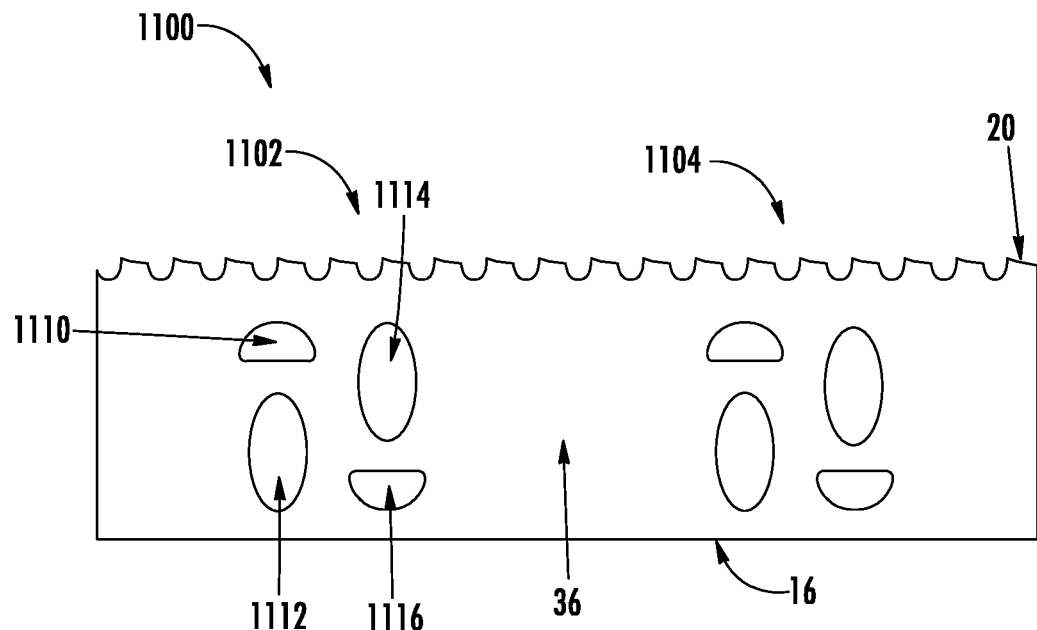
FIG. 17 is a side plan view of the sidewall of a hole saw prior to shaping to a cylindrical structure, according to an exemplary embodiment.

Referring to FIG. 17, a hole saw 1100 is shown according to an exemplary embodiment. Hole saw 1100 is substantially the same as hole saw 10 except for the differences discussed herein. In general, hole saw 1100 includes the same number of opening groups as hole saw 10 and a greater number of openings within each opening group as hole saw 10.

As shown in FIG. 17, hole saw 1100 includes two opening groups, groups 1102 and 1104. Each opening group 1102 and 1104 is separated from adjacent opening groups via uninterrupted areas 36. Opening groups 1102 and 1104 are evenly spaced such that one opening group is located within each 180 degree section around the circumference of hole saw 1100.

Each opening group 1102 and 1104 has four openings, rather than the three openings of hole saw 10. In particular, each opening group 1102 and 1104 includes openings 1110, 1112, 1114, and 1116. As can be seen in FIG. 17, opening 1110 has a shape of a semicircle. Opening 1116 has the same shape as opening 1110. Opening 1112 has a shape of an ellipse, with larger dimensions than the semicircle. Opening 1114 has the same shape as opening 1112. Opening 1110 is aligned with opening 1114 in the circumferential direction and is spaced from both openings 1112 and 1114 in the circumferential/width direction. Openings 1112 and 1116 are located further from cutting teeth 20 than are openings 1110 and 1114.

Opening 1110 has a flat end facing towards endcap 16. Opening 1116 has a flat end facing towards the cutting teeth 20. Openings 1112 and 1114 both have a major axis aligned in the longitudinal direction. Opening 1110 and opening 1114 each has a tangent end that are aligned circumferentially facing the cutting teeth 20. Similarly, opening 1112 and opening 1116 each has a tangent end that are aligned circumferentially facing endcap 16.

In the specific embodiment shown, opening 1112 is aligned with opening 1110 in the longitudinal direction and is located between opening 1110 and endcap 16. Similarly, in the specific embodiment shown, opening 1116 is aligned with opening 1114 in the longitudinal direction and is located between opening 1114 and endcap 16.

Figure 18:
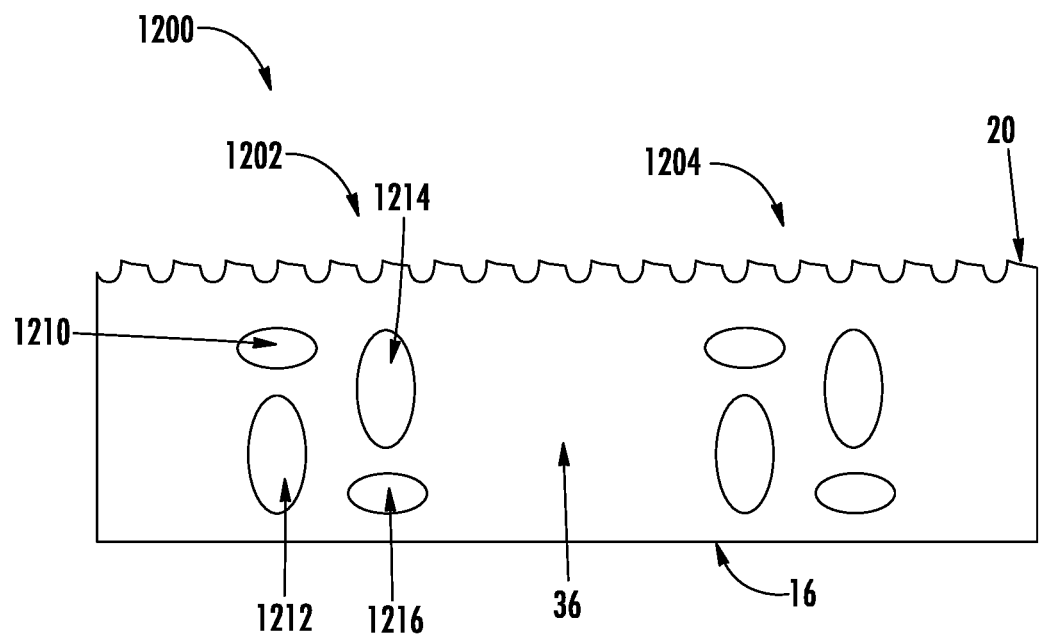
FIG. 18 is a side plan view of the sidewall of a hole saw prior to shaping to a cylindrical structure, according to an exemplary embodiment.

Referring to FIG. 18, a hole saw 1200 is shown according to an exemplary embodiment. Hole saw 1200 is substantially the same as hole saw 1100 except for the differences discussed herein. In general, hole saw 1100 includes the same number of opening groups, and the same number of openings within each group opening, as hole saw 1100.

As shown in FIG. 18, hole saw 1200 includes two opening groups, groups 1202 and 1204. Each opening group 1202 and 1204 is separated from adjacent opening groups via uninterrupted areas 36. Opening groups 1202 and 1204 are evenly spaced such that one opening group is located within each 180 degree section around the circumference of hole saw 1200.

Each opening group 1202 and 1204 has four openings, similar to the four openings of hole saw 1100. In particular, each opening group 1202 and 1204 includes openings 1210, 1212, 1214, and 1216. As can be seen in FIG. 18, opening 1210 has a shape of a first ellipse. Opening 1216 has the same shape as opening 1210. Opening 1212 has a shape of a second ellipse, with smaller dimensions than the first ellipse. Opening 1214 has the same shape as opening 1212. Opening 1210 is aligned with opening 1214 in the circumferential direction and is spaced from both openings 1212 and 1214 in the circumferential/width direction. Openings 1212 and 1216 are located further from cutting teeth 20 than are openings 1210 and 1214.

Opening 1210 and opening 1216 each has a minor axis aligned in the longitudinal direction. Openings 1112 and 1114 both have a major axis aligned in the longitudinal direction. The minor axis of opening 1210 is aligned longitudinally with the major axis of opening 1212, while the minor axis of opening 1216 is aligned longitudinally with the major axis of opening 1214.

Figure 19:
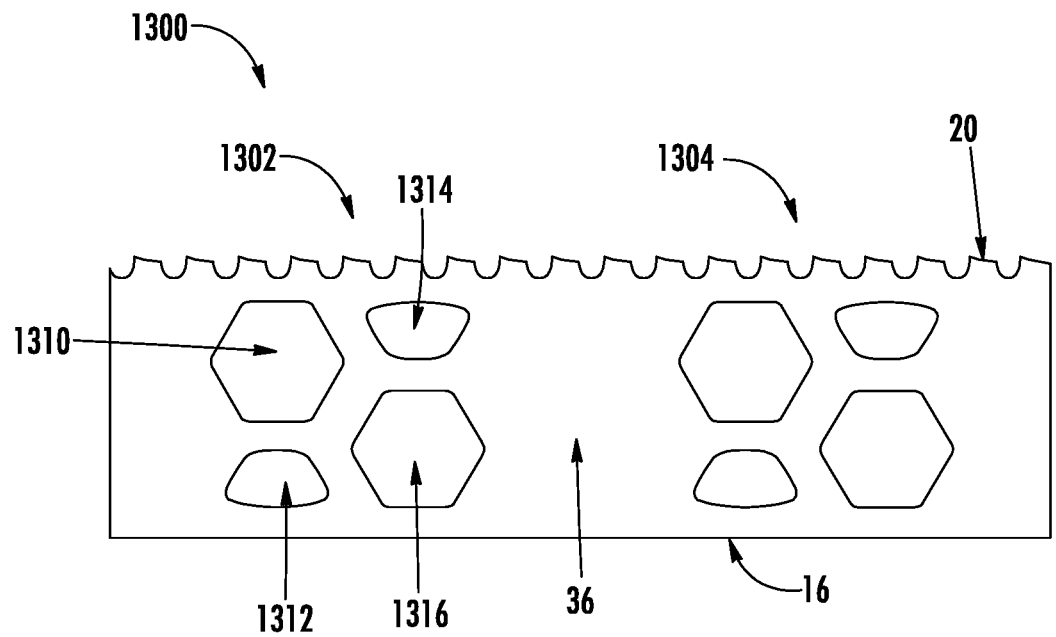
FIG. 19 is a side plan view of the sidewall of a hole saw prior to shaping to a cylindrical structure, according to an exemplary embodiment.

Referring to FIG. 19, a hole saw 1300 is shown according to an exemplary embodiment. Hole saw 1300 is substantially the same as hole saw 1100 except for the differences discussed herein. In general, hole saw 1300 includes the same number of opening groups, and the same number of openings within each opening group, as hole saw 1100.

As shown in FIG. 19, hole saw 1300 includes two opening groups, groups 1302 and 1304. Each opening group 1302 and 1304 is separated from adjacent opening groups via uninterrupted areas 36. Opening groups 1302 and 1304 are evenly spaced such that one opening group is located within each 180 degree section around the circumference of hole saw 1300.

Each opening group 1302 and 1304 has four openings, similar to the four openings of hole saw 1100. In particular, each opening group 1302 and 1304 includes openings 1310, 1312, 1314, and 1316. As can be seen in FIG. 19, opening 1310 has a shape of a hexagon. Opening 1316 has the same shape as opening 1110. Opening 1312 has a shape of a semi-hexagon with smaller dimensions than the hexagon, and has rounded corners, a rounded base edge, and a rounded top edge. Opening 1314 has the same shape as opening 1312. The rounded base edge of opening 1312 faces towards endcap 16, and the rounded top edge of opening 1312 faces towards cutting teeth 20. The rounded base edge of opening 1314 faces towards cutting teeth 20, and the rounded top edge of opening 1314 faces towards endcap 16. Opening 1310 is aligned with opening 1314 in the circumferential direction and is spaced from both openings 1312 and 1314 in the circumferential/width direction. Openings 1312 and 1316 are located further from cutting teeth 20 than are openings 1310 and 1314.

In the specific embodiment shown, opening 1312 is aligned with opening 1310 in the longitudinal direction and is located between opening 1310 and endcap 16. Similarly, in the specific embodiment shown, opening 1316 is aligned with opening 1314 in the longitudinal direction and is located between opening 1314 and endcap 16.

Figure 20:
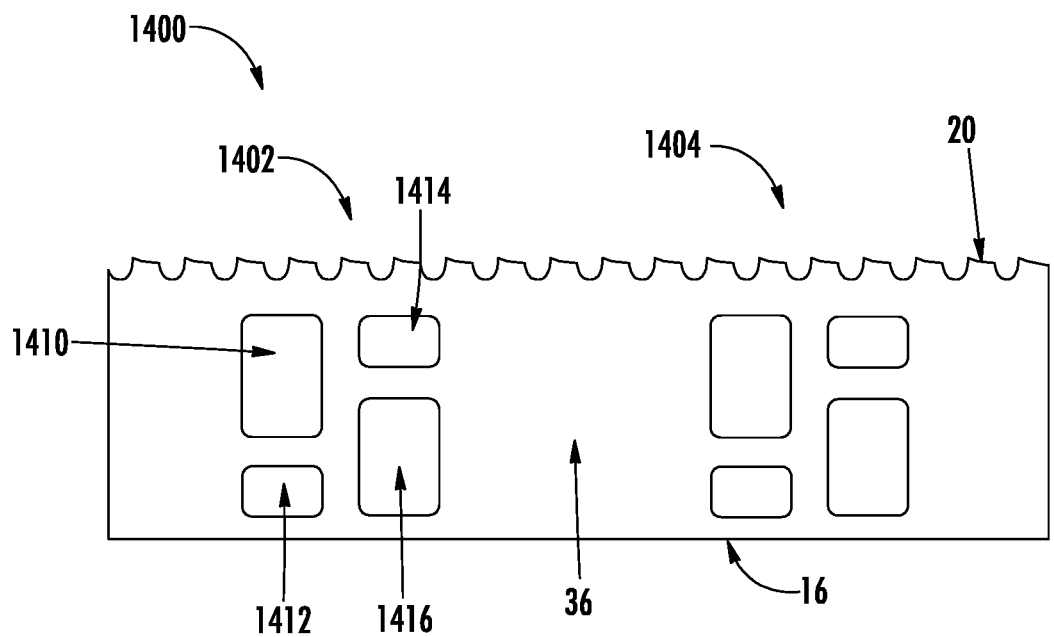
FIG. 20 is a side plan view of the sidewall of a hole saw prior to shaping to a cylindrical structure, according to an exemplary embodiment.

Referring to FIG. 20, a hole saw 1400 is shown according to an exemplary embodiment. Hole saw 1400 is substantially the same as hole saw 10 except for the differences discussed herein. In general, hole saw 1400 includes the same number of opening groups as hole saw 10 and a greater number of openings within each opening group than hole saw 10.

As shown in FIG. 20, hole saw 1400 includes two opening groups, groups 1402 and 1404. Each opening group 1402 and 1404 is separated from adjacent opening groups via uninterrupted areas 36. Opening groups 1402 and 1404 are evenly spaced such that one opening group is located within each 180 degree section around the circumference of hole saw 1400.

Each opening group 1402 and 1404 has four openings, rather than the three openings of hole saw 10. In particular, each opening group 1402 and 1404 includes openings 1410, 1412, 1414, and 1416. As can be seen in FIG. 20, opening 1410 has a shape of a first rectangle. Opening 1416 has the same shape as opening 1410. Opening 1412 has a shape of a second rectangle, with a smaller height than, and a same width as, the first rectangle. Opening 1414 has the same shape as opening 1412. Opening 1410 is spaced from both openings 1412 and 1414 in the circumferential/width direction. Openings 1412 and 1416 are located further from cutting teeth 20 than are openings 1410 and 1414.

In the specific embodiment shown, opening 1412 is aligned with opening 1410 in the longitudinal direction and is located between opening 1410 and endcap 16. Similarly, in the specific embodiment shown, opening 1416 is aligned with opening 1414 in the longitudinal direction and is located between opening 1414 and endcap 16.

Figure 21:
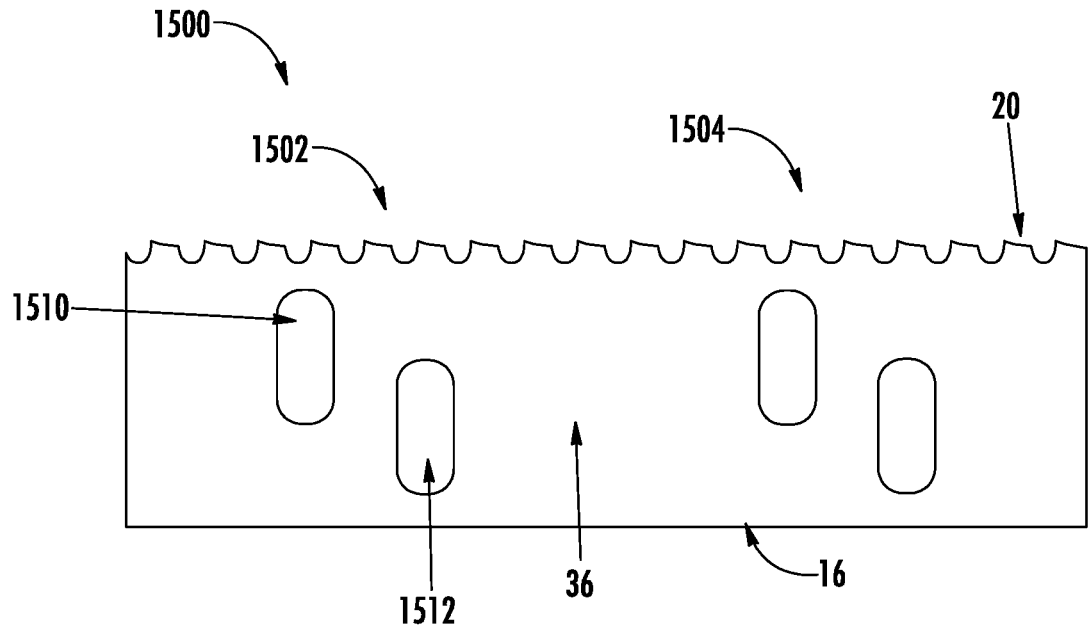
FIG. 21 is a side plan view of the sidewall of a hole saw prior to shaping to a cylindrical structure, according to an exemplary embodiment.

Referring to FIG. 21, a hole saw 1500 is shown according to an exemplary embodiment. Hole saw 1500 is substantially the same as hole saw 10 except for the differences discussed herein. In general, hole saw 1500 includes the same number of opening groups as hole saw 10 and fewer openings within each opening group as hole saw 10.

As shown in FIG. 21, hole saw 1500 includes two opening groups, groups 1502 and 1504. Each opening group 1502 and 1504 is separated from adjacent opening groups via uninterrupted areas 36. Opening groups 1502 and 1504 are evenly spaced such that one opening group is located within each 180 degree section around the circumference of hole saw 1500.

Each opening group 1502 and 1504 has two openings, rather than the three openings of hole saw 10. In particular, each opening group 1502 and 1504 includes openings 1510 and 1512. As can be seen in FIG. 21, opening 1510 has a shape of a slot. Opening 1512 has the same shape as opening 1510. Opening 1510 and opening 1512 each has a pair of tangential ends, with a first tangential end facing towards the cutting teeth 20, and a second tangential end facing towards endcap 16. Openings 1510 and 1512 each has a major axis positioned longitudinally between the cutting teeth 20 and endcap 16. Opening 1510 has a minor axis aligned horizontally with the first tangential end of opening 1512. Opening 1512 has a minor axis aligned horizontally with the second tangential end of opening 1510. Opening 1510 is spaced from opening 1512 in the circumferential/width direction.

Figure 22:
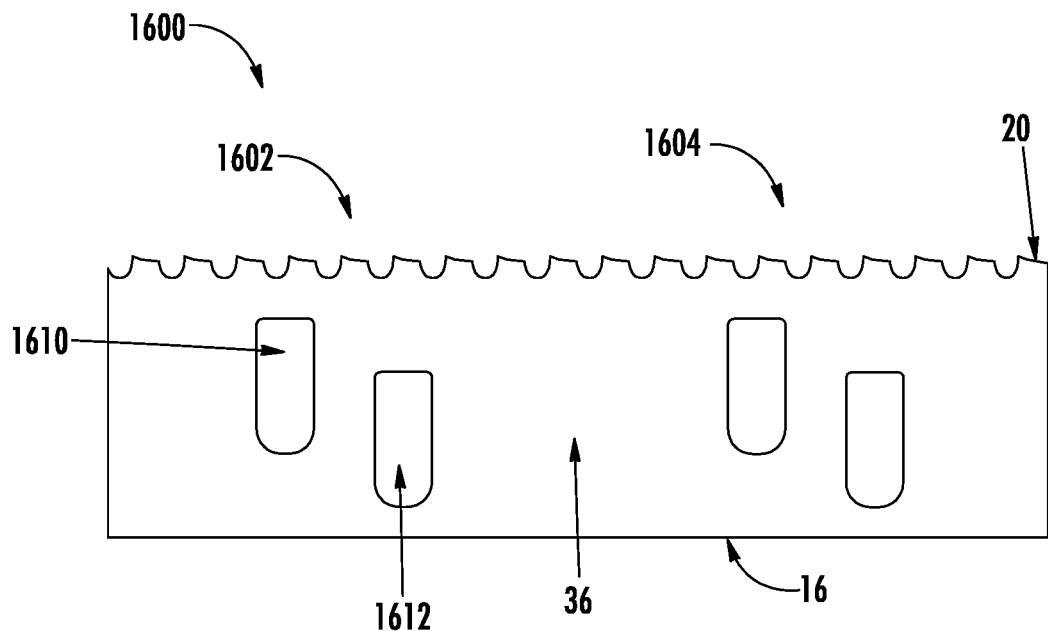
FIG. 22 is a side plan view of the sidewall of a hole saw prior to shaping to a cylindrical structure, according to an exemplary embodiment.

Referring to FIG. 22, a hole saw 1600 is shown according to an exemplary embodiment. Hole saw 1600 is substantially the same as hole saw 1500 except for the differences discussed herein. In general, hole saw 1600 includes the same number of opening groups, and the same number of openings within each opening group, as hole saw 1500.

As shown in FIG. 22, hole saw 1600 includes two opening groups, groups 1602 and 1604. Each opening group 1602 and 1604 is separated from adjacent opening groups via uninterrupted areas 36. Opening groups 1602 and 1604 are evenly spaced such that one opening group is located within each 180 degree section around the circumference of hole saw 1600.

Each opening group 1602 and 1604 has two openings, similar to hole saw 1500. In particular, each opening group 1602 and 1604 includes openings 1610 and 1612. As can be seen in FIG. 22, opening 1610 has a shape of a profile. Opening 1612 has the same shape as opening 1510. Opening 1610 and opening 1612 each has a flat edge facing towards the cutting teeth 20, a pair of parallel edges aligned longitudinally, and an arcuate edge facing towards endcap 16. Opening 1612 is staggered longitudinally and circumferentially with respect to opening 1610, with its arcuate edge closer to endcap 16, and its flat edge further from the cutting teeth 20. Opening 1610 is spaced from opening 1612 in the circumferential/width direction.

Figure 23:
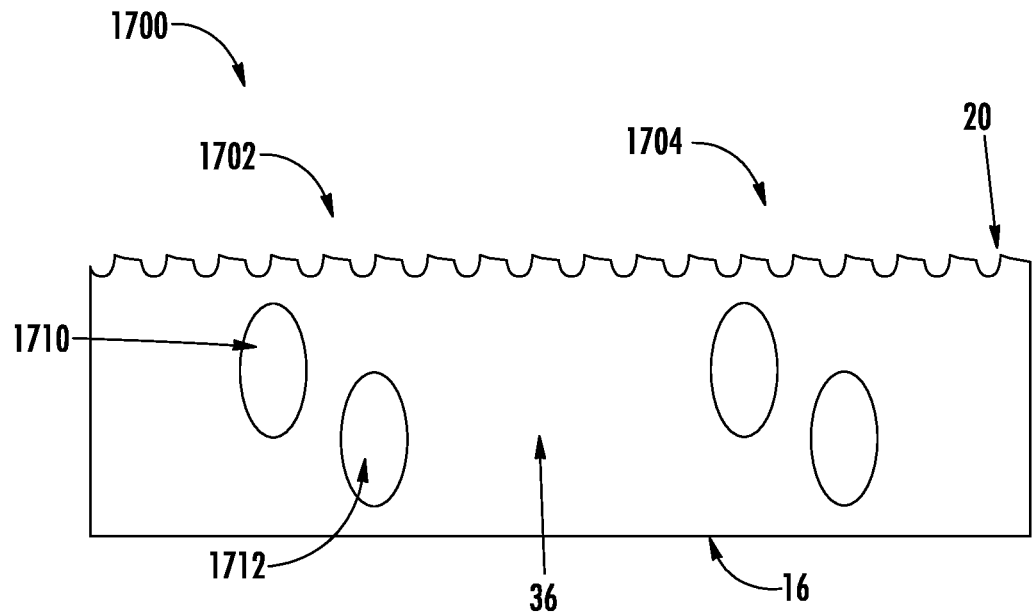
FIG. 23 is a side plan view of the sidewall of a hole saw prior to shaping to a cylindrical structure, according to an exemplary embodiment.

Referring to FIG. 23, a hole saw 1700 is shown according to an exemplary embodiment. Hole saw 1700 is substantially the same as hole saw 1500 except for the differences discussed herein. In general, hole saw 1700 includes the same number of opening groups, and the same number of openings within each opening group, as hole saw 1500.

As shown in FIG. 23, hole saw 1700 includes two opening groups, groups 1702 and 1704. Each opening group 1702 and 1704 is separated from adjacent opening groups via uninterrupted areas 36. Opening groups 1702 and 1704 are evenly spaced such that one opening group is located within each 180 degree section around the circumference of hole saw 1700.

Each opening group 1702 and 1704 has two openings, similar to hole saw 1500. In particular, each opening group 1702 and 1704 includes openings 1710 and 1712. As can be seen in FIG. 23, opening 1710 has a shape of an ellipse. Opening 1712 has the same shape as opening 1710. Opening 1710 and opening 1712 each has a pair of tangential ends, with a first tangential end facing towards the cutting teeth 20, and a second tangential end facing towards endcap 16. Openings 1710 and 1712 each has a major axis positioned longitudinally between the cutting teeth 20 and endcap 16. Opening 1710 has a minor axis aligned horizontally with the first tangential end of opening 1712. Opening 1712 has a minor axis aligned horizontally with the second tangential end of opening 1710. Opening 1710 is spaced from opening 1712 in the circumferential/width direction.

Figure 24:
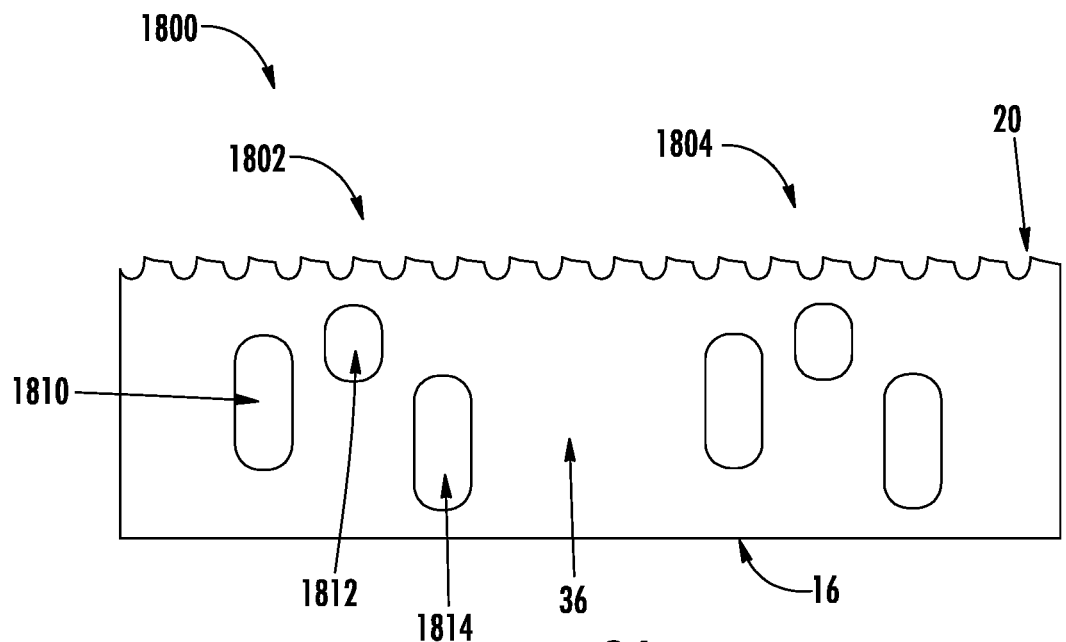
FIG. 24 is a side plan view of the sidewall of a hole saw prior to shaping to a cylindrical structure, according to an exemplary embodiment.

Referring to FIG. 24, a hole saw 1800 is shown according to an exemplary embodiment. Hole saw 1800 is substantially the same as hole saw 10 except for the differences discussed herein. In general, hole saw 1800 includes the same number of opening groups, and the same number of openings within each opening group, as hole saw 10.

As shown in FIG. 24, hole saw 1800 includes two opening groups, groups 1802 and 1804. Each opening group 1802 and 1804 is separated from adjacent opening groups via uninterrupted areas 36. Opening groups 1802 and 1804 are evenly spaced such that one opening group is located within each 180 degree section around the circumference of hole saw 1800.

Each opening group 1802 and 1804 has three openings. In particular, each opening group 1802 and 1804 includes openings 1810, 1812, and 1814. As can be seen in FIG. 24, opening 1810 has a shape of a first slot. Opening 1814 has the same shape as opening 1810. Opening 1812 has a shape of a second slot, with smaller dimensions than the first slot. Opening 1810 is spaced from openings 1812 and 1814 in the circumferential/width direction. Opening 1810 is positioned closer to opening 1812 than opening 1812 is to opening 1814. Openings 1810, 1812, and 1814 each has a pair of tangential ends, with a first tangential end facing the cutting teeth 20 and a second tangential end facing endcap 16. Openings 1810, 1812, and 1814 each has a major axis aligned longitudinally between the cutting teeth 20 and endcap 16. Opening 1810 has a center positioned midway between the cutting teeth 20 and endcap 16. Opening 1812 has a center positioned closer to the cutting teeth 20. Opening 1814 has a center positioned closer to endcap 16.

Figure 25:
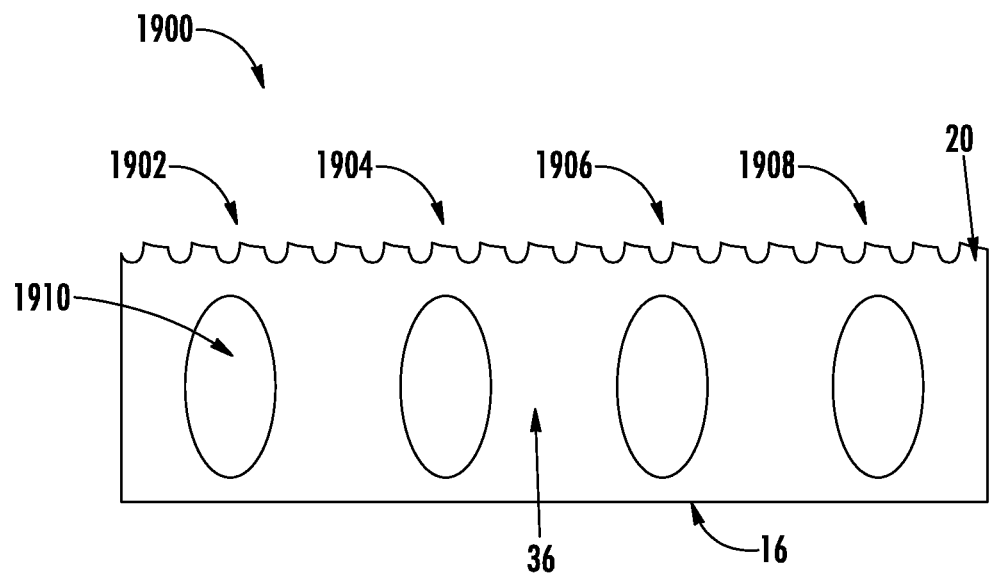
FIG. 25 is a side plan view of the sidewall of a hole saw prior to shaping to a cylindrical structure, according to an exemplary embodiment.

Referring to FIG. 25, a hole saw 1900 is shown according to an exemplary embodiment. Hole saw 1900 is substantially the same as hole saw 10 except for the differences discussed herein. In general, hole saw 1900 includes more opening groups, and fewer openings within each opening group, as hole saw 10.

As shown in FIG. 25, hole saw 1900 includes four opening groups, groups 1902, 1904, 1906, and 1908. Each opening group 1902, 1904, 1906, and 1908 is separated from adjacent opening groups via uninterrupted areas 36. Opening groups 1902, 1904, 1906, and 1908 are evenly spaced such that one opening group is located within each 90 degree section around the circumference of hole saw 1900.

Each opening group 1902, 1904, 1906, and 1908 has one opening. In particular, each opening group 1902, 1904, 1906, and 1908 includes opening 1910. As can be seen in FIG. 25, opening 1910 has a shape of an ellipse. Opening 1910 has a pair of tangential ends, with a first tangential end facing towards the cutting teeth 20, and a second tangential end facing towards endcap 16. Opening 1910 has a major axis positioned longitudinally between the cutting teeth 20 and endcap 16.

Figure 26:
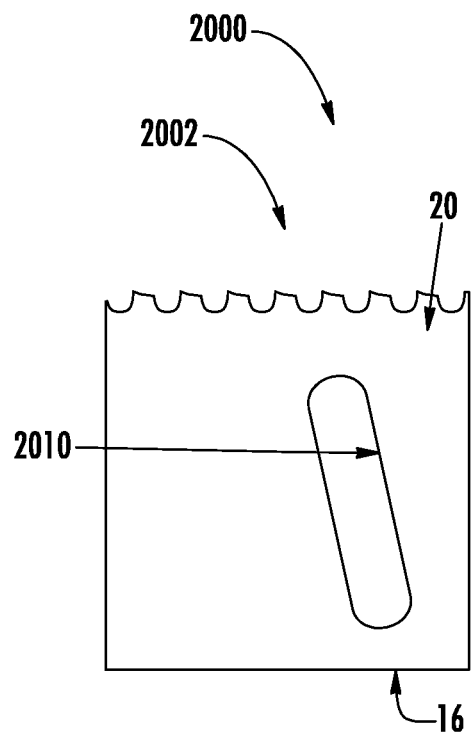
FIG. 26 is a side plan view of the sidewall of a hole saw prior to shaping to a cylindrical structure, according to an exemplary embodiment.

Referring to FIG. 26, a hole saw 2000 is shown according to an exemplary embodiment. Hole saw 2000 is substantially the same as hole saw 10 except for the differences discussed herein. In general, hole saw 2000 includes fewer opening groups than hole saw 10, and fewer openings within each opening group than hole saw 10.

As shown in FIG. 26, hole saw 2000 includes one opening group, group 2002. Opening group 2002 is located within a section around the circumference of hole saw 2000.

Opening group 2002 has one opening. In particular, opening group 2002 includes opening 2010. As can be seen in FIG. 26, opening 2010 has a shape of a slot. The slot of opening 2010 has a first tangent end leaning upward and left towards cutting teeth 20, and a second tangent end leaning downward and right towards endcap 16.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended to include one or more than one component or element, and is not intended to be construed as meaning only one.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another, or with the two members and any additional member being attached to one another. Such joining may be permanent in nature or alternatively may be removable or releasable in nature. Various embodiments of the invention relate to any combination of any of the features, and any such combination of features may be claimed in this or future applications.

Any of the features, elements, or components of any of the exemplary embodiments discussed above may be utilized alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. A hole saw comprising:
    a saw body, comprising:
        a first end;
        a second end opposite the first end along an axis;
        an outer surface extending circumferentially around the axis; and
        an inner surface opposite the outer surface and defining a hollow internal area;
    cutting teeth extending from the first end of the saw body;
    an end cap coupled to the second end of the saw body;
    an arbor configured to couple the hole saw to a driving tool, the arbor extending outward from the end cap in a direction opposite from the cutting teeth; and
    a group of openings extending between the outer surface and the inner surface of the saw body, wherein the group of openings comprises:
        a first discrete opening having a first shape; and
        a second discrete opening having a second shape, wherein the second discrete opening is smaller than the first discrete opening, and the second discrete opening is located closer to the cutting teeth than the first discrete opening;
    wherein the first shape is symmetrical in a longitudinal direction parallel to the axis;
    wherein the second shape is asymmetrical in the longitudinal direction; and
    wherein the saw body and the cutting teeth are formed from a single, contiguous, continuous piece of metal material.

2. The hole saw of claim 1, wherein the first shape is symmetrical in a circumferential direction along the outer surface with respect to the axis, and wherein the second shape is symmetrical in the circumferential direction.

3. The hole saw of claim 1, wherein the second discrete opening is aligned with the first discrete opening in a longitudinal direction such that the second discrete opening is between the first discreet opening and the cutting teeth.

4. The hole saw of claim 1, wherein the group of openings is a first group of openings and further comprising:
    a second group of openings extending between the outer surface and the inner surface of the saw body, wherein the second group of openings comprises:

a third discrete opening having the first shape; and
a fourth discrete opening having the second shape.

5. The hole saw of claim 4, wherein an uninterrupted area is located between the first group of openings and the second group of openings, and wherein the uninterrupted area extends from the cutting teeth to the second end of the saw body.

6. The hole saw of claim 4, wherein a total circumferential width of both the first group of openings and the second group of openings combined is at least 50% of a total circumferential width of the saw body.

7. A hole saw comprising:
a saw body, comprising:
a first end;
a second end opposite the first end along an axis;
an outer surface extending circumferentially around the axis; and
an inner surface defining a hollow internal area;
cutting teeth extending from the first end of the saw body;
an end cap coupled to the second end of the saw body;
an arbor configured to couple the hole saw to a driving tool, the arbor extending outward from the end cap in a direction opposite from the cutting teeth;
a first group of at least two discrete openings extending between the outer surface and the inner surface of the saw body, the first group comprising:
a first discrete opening having a first shape; and
a second discrete opening having a second shape, wherein the second discrete opening is smaller than the first discrete opening, and the second discrete opening is located closer to the cutting teeth than the first discrete opening;
wherein the first shape is symmetrical in a circumferential direction along the outer surface with respect to the axis, and wherein the second shape is asymmetrical in a longitudinal direction parallel to the axis;
a second group of at least two discrete openings extending between the outer surface and the inner surface of the saw body, the second group comprising:
a third discrete opening having a third shape; and
a fourth discrete opening having a fourth shape, wherein the fourth discrete opening is smaller than the third discrete opening, and the fourth discrete opening is located closer to the cutting teeth than the third discrete opening; and
an uninterrupted area located between the first group of at least two discrete openings and the second group of at least two discrete openings, the uninterrupted area extending from the first end of the saw body to the second end of the saw body.

8. The hole saw of claim 7, wherein the uninterrupted area defines a first width and the first group of at least two discrete openings defines a second width, and wherein the first width and the second width are within 50% of each other.

9. The hole saw of claim 8, wherein the first width and the second width are within 30% of each other.

10. The hole saw of claim 7, wherein the first shape is symmetrical in the longitudinal direction.

11. The hole saw of claim 7, wherein the second shape matches a lower portion of the first shape.

12. The hole saw of claim 7, wherein the first shape and the third shape are the same size and shape as each other.

13. The hole saw of claim 12, wherein the second shape and the fourth shape have the same size and shape as each other.

14. The hole saw of claim 7, wherein the saw body and the cutting teeth are formed from a single, contiguous, continuous piece of metal material.

15. A hole saw comprising:
a saw body, comprising:
a first end;
a second end opposite the first end along a longitudinal axis;
an outer surface extending circumferentially around the longitudinal axis; and
an inner surface defining a hollow internal area;
cutting teeth extending from the first end of the saw body;
an end cap coupled to the second end of the saw body;
an arbor configured to couple the hole saw to a driving tool, the arbor extending outward from the end cap in a direction opposite from the cutting teeth;
a first group of at least two discrete openings extending between the outer surface and the inner surface of the saw body, the first group comprising:
a first discrete opening having a first shape; and
a second discrete opening having a second shape, the second discrete opening located closer to the cutting teeth than the first discrete opening;
a second group of at least two discrete openings extending between the outer surface and the inner surface of the saw body, the second group of at least two discrete openings spaced apart from the first group of at least two discrete openings in a circumferential direction along the outer surface with respect to the longitudinal axis, the second group comprising:
a third discrete opening having the first shape; and
a fourth discrete opening having the second shape; and
an uninterrupted area located between the first group of at least two discrete openings and the second group of at least two discrete openings;
wherein the second shape matches a lower portion of the first shape;
wherein the second shape is defined in part by a flat edge that extends in the circumferential direction and faces the cutting teeth, a first width of the second shape measured along the flat edge; and
wherein the first width is greater than a second width of the second shape measured along an edge opposite from the flat edge and facing the second end of the saw body.

16. The hole saw of claim 15, wherein the fourth discrete opening is located closer to the cutting teeth than the third discrete opening.

17. The hole saw of claim 15, wherein the second shape is a smaller size than the first shape, and wherein the flat edge extends in the circumferential direction oriented perpendicular to the longitudinal axis of the hole saw.

18. The hole saw of claim 15, wherein the first shape is symmetrical in the circumferential direction, and wherein the second shape is symmetrical in the circumferential direction.

19. The hole saw of claim 15, wherein the first shape is symmetrical in a direction parallel to the longitudinal axis.

* * * * *